(12) United States Patent
Harish

(10) Patent No.: US 7,644,628 B2
(45) Date of Patent: Jan. 12, 2010

(54) RESISTIVE FORCE SENSING DEVICE AND METHOD WITH AN ADVANCED COMMUNICATION INTERFACE

(75) Inventor: Divyasimha Harish, Fremont, CA (US)

(73) Assignee: Loadstar Sensors, Inc., Fremont, CA (US)

( * ) Notice: Subject to any disclaimer, the term of this patent is extended or adjusted under 35 U.S.C. 154(b) by 0 days.

(21) Appl. No.: 12/477,927

(22) Filed: Jun. 4, 2009

(65) Prior Publication Data

US 2009/0234592 A1  Sep. 17, 2009

Related U.S. Application Data

(63) Continuation of application No. 11/365,358, filed on Mar. 1, 2006, now Pat. No. 7,570,065, and a continuation of application No. 12/234,745, filed on Sep. 22, 2008, and a continuation of application No. 12/032,718, filed on Feb. 18, 2008.

(60) Provisional application No. 60/974,434, filed on Sep. 21, 2007.

(51) Int. Cl.
G01B 7/16 (2006.01)
(52) U.S. Cl. .................................. 73/780; 73/862.626
(58) Field of Classification Search ............... 73/780, 73/862.626
See application file for complete search history.

(56) References Cited

U.S. PATENT DOCUMENTS

| 3,612,966 | A |   | 10/1971 | Dybel |
|---|---|---|---|---|
| 4,030,347 | A |   | 6/1977 | Norris et al. |
| 4,191,268 | A | * | 3/1980 | Miyoshi et al. ......... 177/210 C |
| 4,558,600 | A | * | 12/1985 | Lee ....................... 73/862.626 |
| 4,884,223 | A |   | 11/1989 | Ingle et al. |
| 4,914,611 | A |   | 4/1990 | Yamanaka et al. |
| 4,944,181 | A |   | 7/1990 | Wnuk |
| 5,129,152 | A | * | 7/1992 | Barr ............................. 33/503 |
| 5,503,034 | A |   | 4/1996 | Amano et al. |
| 5,510,581 | A | * | 4/1996 | Angel ........................ 177/211 |
| 5,811,684 | A |   | 9/1998 | Sokn |
| 5,969,270 | A |   | 10/1999 | Doemes et al. |
| 5,974,895 | A |   | 11/1999 | Steger et al. |
| 5,999,168 | A |   | 12/1999 | Rosenberg et al. |
| 6,053,050 | A |   | 4/2000 | Zahzah et al. |
| 6,079,282 | A |   | 6/2000 | Lanter |

(Continued)

FOREIGN PATENT DOCUMENTS

EP  0438660 B1  1/1995

(Continued)

*Primary Examiner*—Max Noori
(74) *Attorney, Agent, or Firm*—Raj Abhyanker LLP

(57) ABSTRACT

Several methods and a system of a resistive force sensing device and method with an advanced communication interface are disclosed. An exemplary embodiment provides a force measuring device. The force measuring device includes a resistive sensor having a fixed surface and a movable surface. A spring assembly is positioned between the fixed surface and the movable surface. The spring assembly alters in height in response to a force applied perpendicular to the movable surface and causes a change in a resistance of the resistive sensor. A circuit generates a measurement of the force based on an algorithm that considers a change in the resistance of the resistive sensor. A universal serial bus (USB) interface of the circuit provides digital output of the measurement to a computing device.

1 Claim, 26 Drawing Sheets

U.S. PATENT DOCUMENTS

| | | | |
|---|---|---|---|
| 6,342,880 B2 | 1/2002 | Rosenberg et al. | |
| 6,446,510 B1 | 9/2002 | Kurtz et al. | |
| 6,530,283 B2 | 3/2003 | Okada et al. | |
| 6,532,824 B1 | 3/2003 | Ueno et al. | |
| 6,695,996 B2 * | 2/2004 | Chou | 264/40.5 |
| 6,819,312 B2 | 11/2004 | Fish | |
| 6,820,494 B2 | 11/2004 | Morimoto | |
| 6,829,953 B2 | 12/2004 | Ishiguro et al. | |
| 6,841,840 B2 * | 1/2005 | Sakai | 257/420 |
| 6,989,677 B2 | 1/2006 | Morimoto | |
| 6,990,867 B2 | 1/2006 | Okada | |
| 7,024,947 B2 | 4/2006 | Ishiguro et al. | |
| 7,047,818 B2 | 5/2006 | Dallenbach et al. | |
| 7,086,292 B2 | 8/2006 | Onodera | |
| 7,096,742 B2 * | 8/2006 | Bailey | 73/774 |
| 7,114,399 B2 | 10/2006 | Mallory | |
| 7,126,462 B2 | 10/2006 | Schleif et al. | |
| 7,152,484 B2 | 12/2006 | Meyer et al. | |
| 7,152,485 B2 | 12/2006 | Okada | |
| 7,153,383 B2 | 12/2006 | Gebert | |
| 7,159,471 B2 | 1/2007 | Fortune et al. | |
| 7,259,574 B2 | 8/2007 | Shrikrishna | |
| 7,302,858 B2 | 12/2007 | Walsh et al. | |
| 7,305,890 B2 | 12/2007 | Zias et al. | |
| 7,343,813 B1 | 3/2008 | Harrington | |
| 7,343,814 B2 | 3/2008 | Harish et al. | |
| 7,347,102 B2 | 3/2008 | Moon et al. | |
| 7,353,713 B2 | 4/2008 | Harish et al. | |
| 7,360,439 B2 | 4/2008 | Kuroda et al. | |
| 7,372,281 B2 | 5/2008 | Morimoto | |
| 7,380,461 B2 | 6/2008 | Majeti | |
| 7,395,721 B2 | 7/2008 | Taniguchi | |
| 7,398,587 B2 | 7/2008 | Morimoto | |
| 7,400,153 B2 | 7/2008 | Shoji et al. | |
| 7,434,481 B2 | 10/2008 | Hawes et al. | |
| 7,444,881 B2 | 11/2008 | Sautter et al. | |
| 7,451,659 B2 | 11/2008 | Dallenbach et al. | |
| 7,478,562 B2 | 1/2009 | Kurtz et al. | |
| 7,509,870 B2 | 3/2009 | Aebersold et al. | |
| 7,513,166 B2 | 4/2009 | Shank et al. | |
| 7,526,963 B2 | 5/2009 | Wanami et al. | |
| 7,529,632 B2 | 5/2009 | Ueda et al. | |
| 7,533,569 B2 | 5/2009 | Sheynblat | |
| 7,533,582 B2 | 5/2009 | Okada | |
| 7,535,217 B2 | 5/2009 | Quandt et al. | |
| 7,536,917 B2 | 5/2009 | Baba | |
| 7,538,281 B2 | 5/2009 | Pottebaum et al. | |
| 2002/0043112 A1 | 4/2002 | Schwarz et al. | |
| 2005/0005703 A1 | 1/2005 | Saito et al. | |
| 2005/0252303 A1 | 11/2005 | Taniguchi | |
| 2006/0070451 A1 | 4/2006 | Walsh et al. | |
| 2006/0096384 A1 | 5/2006 | Harish et al. | |
| 2006/0142634 A1 | 6/2006 | Anstadt et al. | |
| 2006/0191350 A1 | 8/2006 | Meehan et al. | |
| 2006/0191351 A1 | 8/2006 | Meehan et al. | |
| 2007/0007050 A1 | 1/2007 | Reber et al. | |
| 2007/0034013 A1 | 2/2007 | Moon et al. | |
| 2007/0062301 A1 | 3/2007 | Dittmar et al. | |
| 2007/0062302 A1 | 3/2007 | Khoury et al. | |
| 2007/0180924 A1 | 8/2007 | Warren et al. | |
| 2007/0186667 A1 | 8/2007 | Deangelis et al. | |
| 2007/0186668 A1 | 8/2007 | Garverick et al. | |
| 2007/0193361 A1 | 8/2007 | Coffey et al. | |
| 2007/0209446 A1 | 9/2007 | Stewart et al. | |
| 2007/0227256 A1 | 10/2007 | Wright | |
| 2007/0227257 A1 | 10/2007 | Harish et al. | |
| 2007/0256501 A1 | 11/2007 | Kurtz et al. | |
| 2007/0277621 A1 | 12/2007 | Schlachter et al. | |
| 2008/0000304 A1 | 1/2008 | Nagle et al. | |
| 2008/0011093 A1 | 1/2008 | Shank et al. | |
| 2008/0030205 A1 | 2/2008 | Fujii et al. | |
| 2008/0030482 A1 | 2/2008 | Elwell et al. | |
| 2008/0034883 A1 | 2/2008 | Majeti | |
| 2008/0041166 A1 | 2/2008 | Kurtz et al. | |
| 2008/0059131 A1 | 3/2008 | Tokita et al. | |
| 2008/0072684 A1 | 3/2008 | Baniecki et al. | |
| 2008/0078254 A1 | 4/2008 | Sautter et al. | |
| 2008/0165159 A1 | 7/2008 | Soss et al. | |
| 2008/0170043 A1 | 7/2008 | Soss et al. | |
| 2008/0190210 A1 | 8/2008 | Harish et al. | |

FOREIGN PATENT DOCUMENTS

| | | |
|---|---|---|
| EP | 0302437 B1 | 4/1995 |
| EP | 0828255 A3 | 4/1999 |
| EP | 0805961 B1 | 9/2002 |
| EP | 0899537 B1 | 10/2004 |
| JP | 2004028626 A2 | 1/2004 |
| JP | 2008151775 A2 | 7/2008 |
| WO | WO-9617233 A1 | 6/1996 |
| WO | WO-9639934 A1 | 12/1996 |
| WO | WO-6011780 A3 | 2/2006 |
| WO | WO-2008015460 A2 | 2/2008 |

* cited by examiner

| CAPACITY 1902 | | L 1904 | W 1906 | H 1908 | D 1910 | K 1912 | THREAD 1914 | WEIGHT 1916 |
|---|---|---|---|---|---|---|---|---|
| lB | N | | | | | | | |
| 25 | 111 | 2.0 (50.8) | 0.5 (12.7) | 2.5 (63.5) | 0.35 (8.9) | 0.7 (17.8) | 1/4-28 | 5 oz (142 g) |
| 50 | 222 | | | | | | | |
| 100 | 445 | | | | | | | |
| 200 | 890 | | | | | | | |
| 300 | 1334 | | | | | | | |
| 500 | 2224 | | 0.96 (24.4) | 3.0 (76.2) | 0.68 (17.3) | 2.0 (50.8) | 1/2-20 | 7.5 oz (212 g) |
| 1000 | 4448 | | | | | | | |
| 2000 | 8896 | | | | | | | 18 oz (510 g) |
| 5000 | 22240 | 2.5 (63.5) | 1.45 (36.8) | 3.5 (88.9) | 0.68 (17.3) | 2.0 (50.8) | 3/4-16 | 53 oz (1500 g) |
| 10000 | 44480 | | | | | | | |

METRIC THREADS AVAILABLE

CAPACITY CHART 1950

RESISTIVE FORCE SENSING DEVICE AND METHOD WITH AN ADVANCED COMMUNICATION INTERFACE

CLAIM OF PRIORITY

This application is a continuation-in-part and claims priority from:

1. U.S. Provisional Application No. 60/461,528 filed on Apr. 9, 2003,
2. U.S. Non-Provisional application Ser. No. 10/823,518 filed on Apr. 9, 2004,
3. U.S. Non-Provisional application Ser. No. 11/237,060 filed on Sep. 28, 2005,
4. U.S. Non-Provisional application Ser. No. 11/237,353 filed on Sep. 28, 2005,
5. U.S. Continuation-in-Part application Ser. No. 11/305,673 filed on Dec. 16, 2005,
6. U.S. Non-Provisional application Ser. No. 11/365,358 filed Mar. 1, 2006.
7. U.S. Provisional Application No. 60/974,434 filed on Sep. 21, 2007,
8. U.S. Non-Provisional application Ser. No. 12/234,745 filed on Sep. 22, 2008,
9. U.S. Continuation-in-Part application Ser. No. 12/032,718 filed on Feb. 18, 2008

FIELD OF TECHNOLOGY

This disclosure relates generally to the technical field of measuring devices and, in one embodiment, a resistive force sensing device and method with an advanced communication interface.

BACKGROUND

A load cell may be a device (e.g., a transducer) that converts a force to a differential signal (e.g., a differential electric signal). The load cell may be used for a variety of industrial applications (e.g., a scale, a truck weighing station, a tension measuring system, a force measurement system, a load measurement system, etc.).

A computing device may communicate with load cell systems (e.g., traditional sensor systems) through an amplifier and a filter attached through a cable, which has some shortcomings including power consumption, unwanted noise, and voltage drop out that would occur if cable range between the amplifier and a display instrument was too long. A computing device may communicate with external devices through a communication interface such as a universal serial bus (USB) interface and/or an Ethernet interface. Furthermore, the computing device may power the external devices through a communication interface (e.g., the Ethernet interface, the USB interface). The computing device may not be able to communicate with the load cell through an advanced communication interface.

SUMMARY

This Summary is provided to comply with 37 C.F.R. §1.73. It is submitted with the understanding that it will not be used to limit the scope or meaning of the claims.

Several methods and a system of resistive force sensing device and method with an advanced communication interface are disclosed.

An exemplary embodiment relates to a force measuring device that includes a resistive sensor having a fixed surface and a movable surface. The force measuring device further includes a spring assembly positioned between the fixed surface and the movable surface. The height of the spring assembly is altered in response to a force applied perpendicular to the movable surface, thereby causing a change in a resistance of the resistive sensor. The device further includes a circuit to generate a measurement of the force based on an algorithm that considers a change in the resistance of the resistive sensor. The device also includes a data processing module of the force measuring device to communicate the measurement through an advanced communication interface.

An additional exemplary embodiment relates to a method that includes forming a resistive sensor through a fixed surface and a movable surface. The method further includes positioning a spring assembly between the fixed surface and the movable surface. The height of the spring assembly is altered in response to a force applied perpendicular to the movable surface, thereby causing a change in the resistance of the resistive sensor. The method further includes generating a measurement of the force through a circuit based on an algorithm that considers a change in the resistance of the resistive sensor. The method further includes communicating the measurement through an advanced communication interface through a data processing module of the force measuring device.

Yet another exemplary embodiment relates to a system that includes a force measuring device having a spring assembly positioned between a fixed surface and a movable surface. The height of a spring assembly is altered in response to a force applied perpendicular to the movable surface, thereby causing a change in a resistance of the resistive sensor. The system further includes a network and a data processing system communicatively coupled with the force measuring device through an advanced communication interface of the force measuring device. The force measuring device includes a circuit that generates a measurement of the force based on an algorithm that considers a change in the resistance of the resistive sensor.

Other aspects will be apparent from the following description and the appended claims.

BRIEF DESCRIPTION OF THE VIEWS OF DRAWINGS

Example embodiments are illustrated by way of example and not limitation in the figures of accompanying drawings, in which like references indicate similar elements and in which.

Figure 15A:
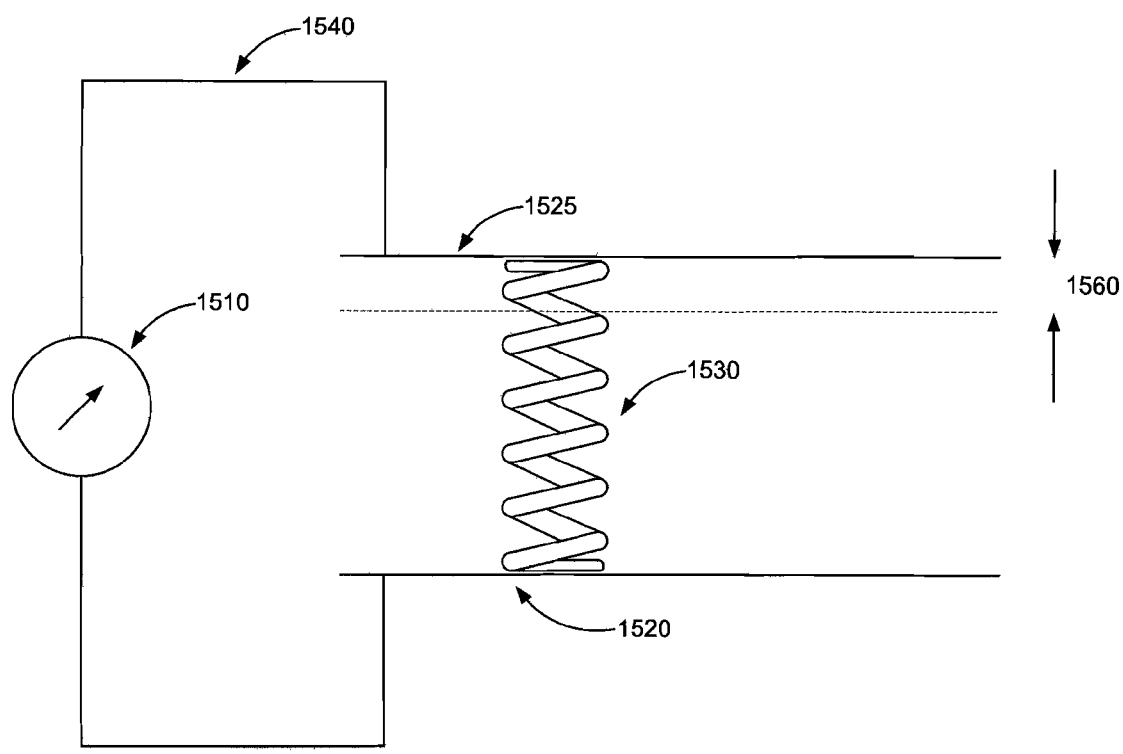
Figure 15B:
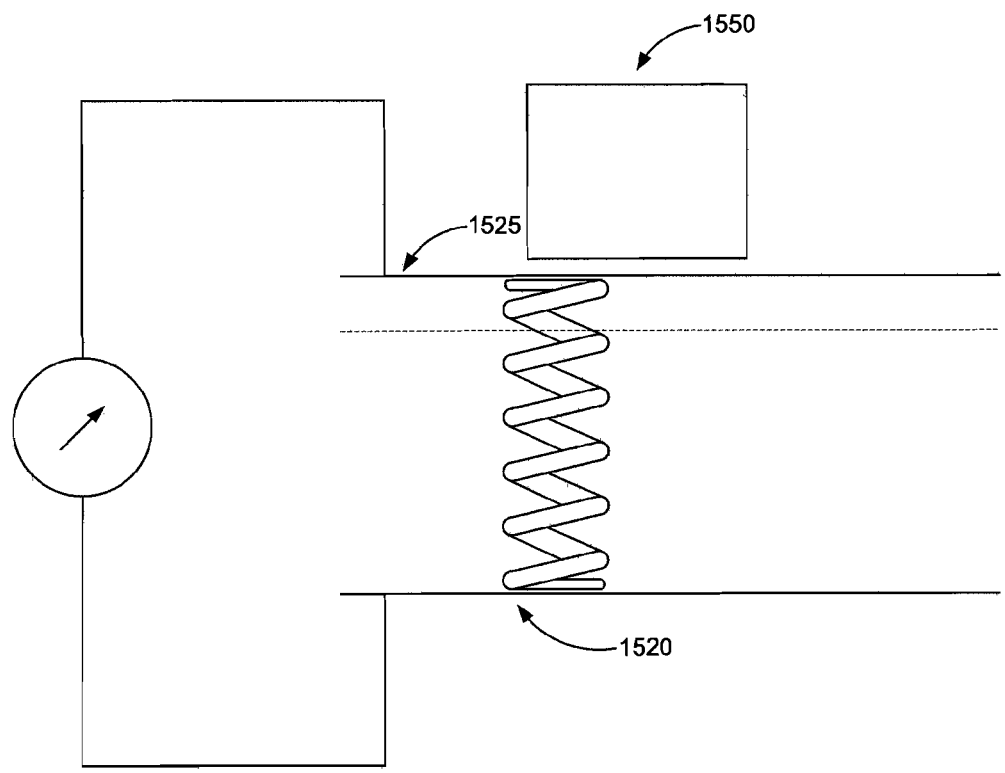

FIG. 15A-B illustrates an example embodiment of a capacitive force sensing device, according to one embodiment.

Figure 16:
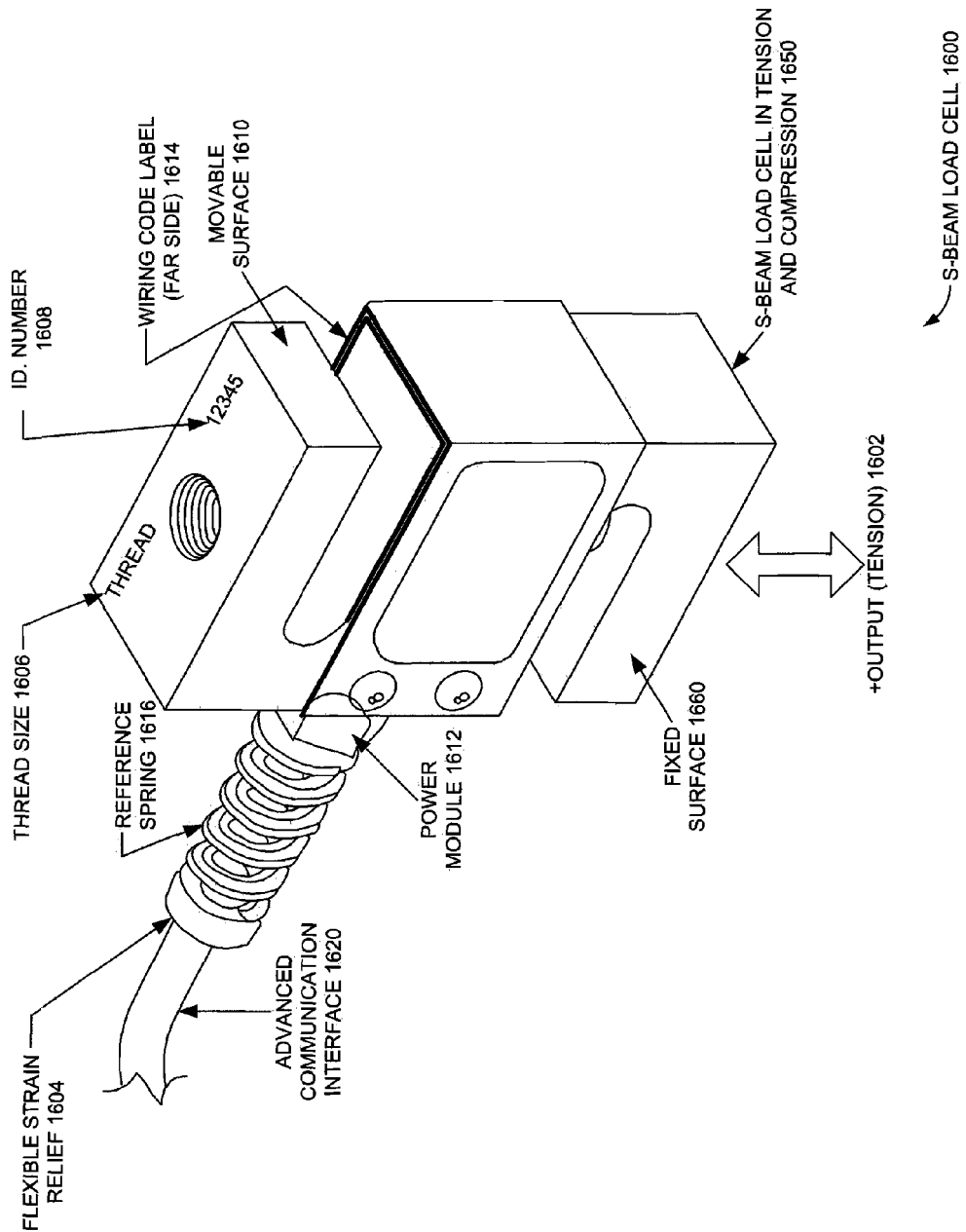

FIG. 16 is a perspective view of an S-beam load cell, according to one embodiment.

Figure 17:
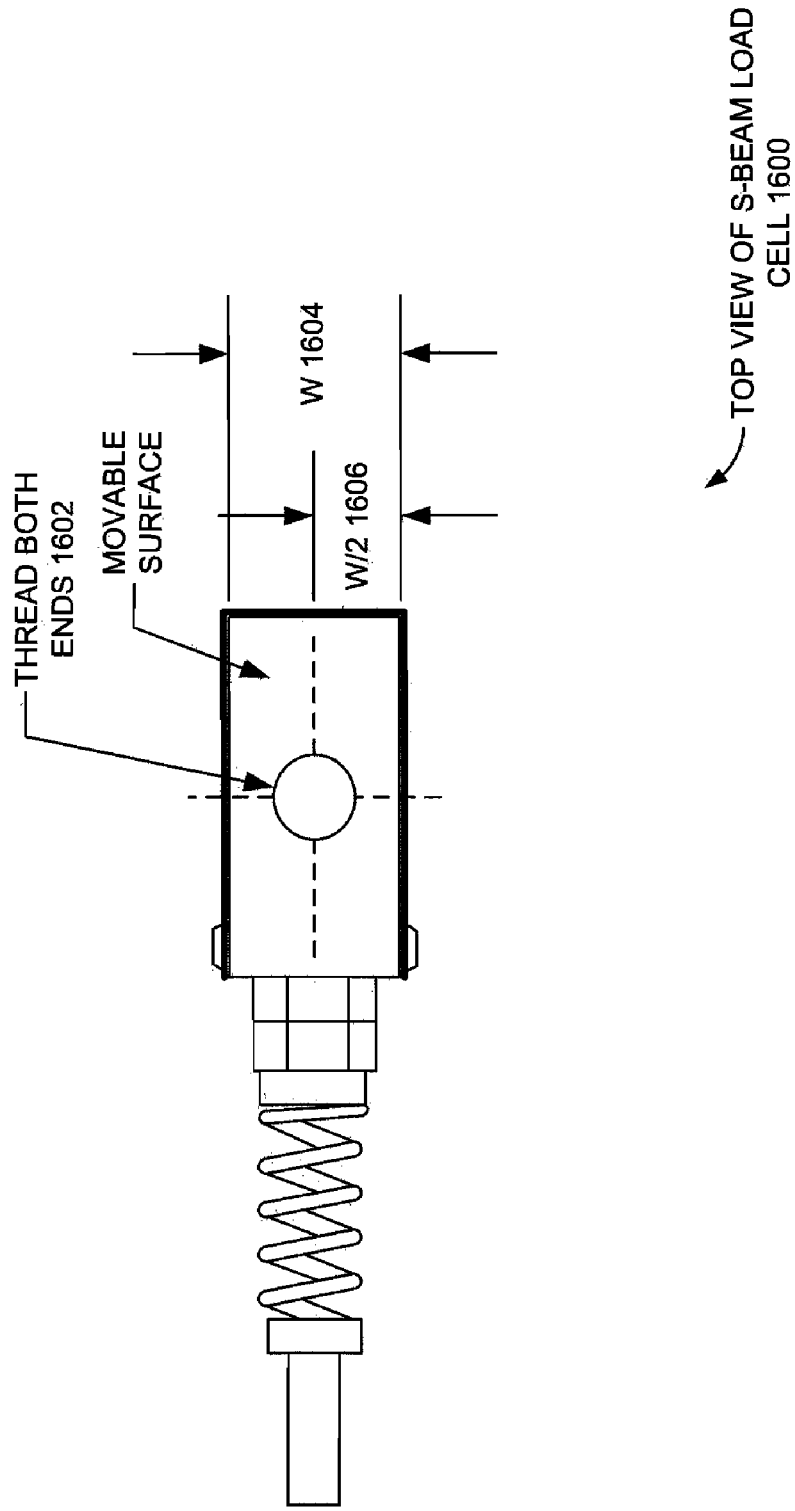

FIG. 17 illustrates a top view of an S-Beam load cell 1600 of FIG. 16, according to one embodiment.

Figure 18:
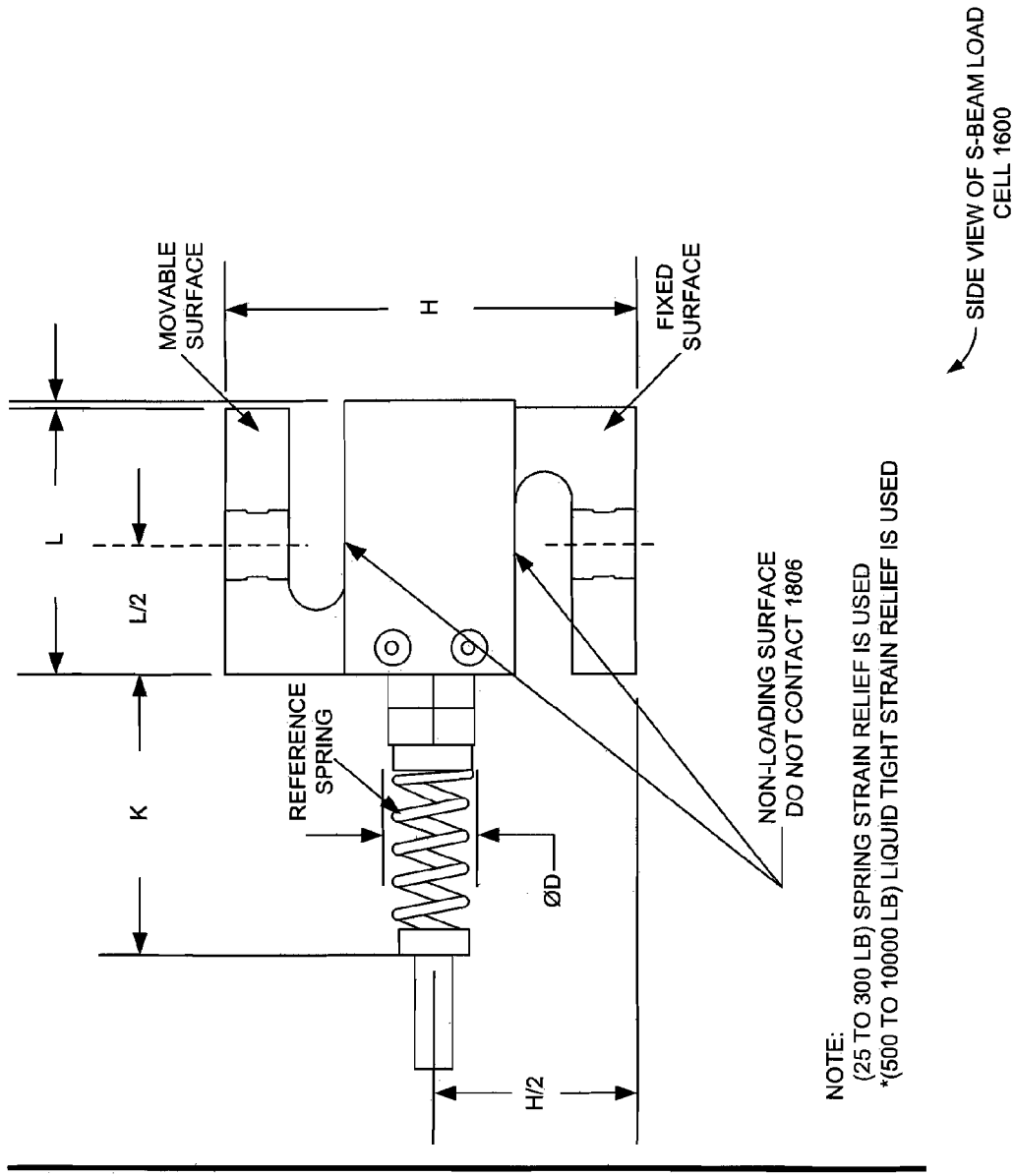

FIG. 18 illustrates the side view of an S-Beam load cell of FIG. 16, according to one embodiment.

Figure 19:

FIG. 19 illustrates a tabular format of different sensor and their characteristics in relation to thread type and weight, according to one embodiment.

Figure 20:
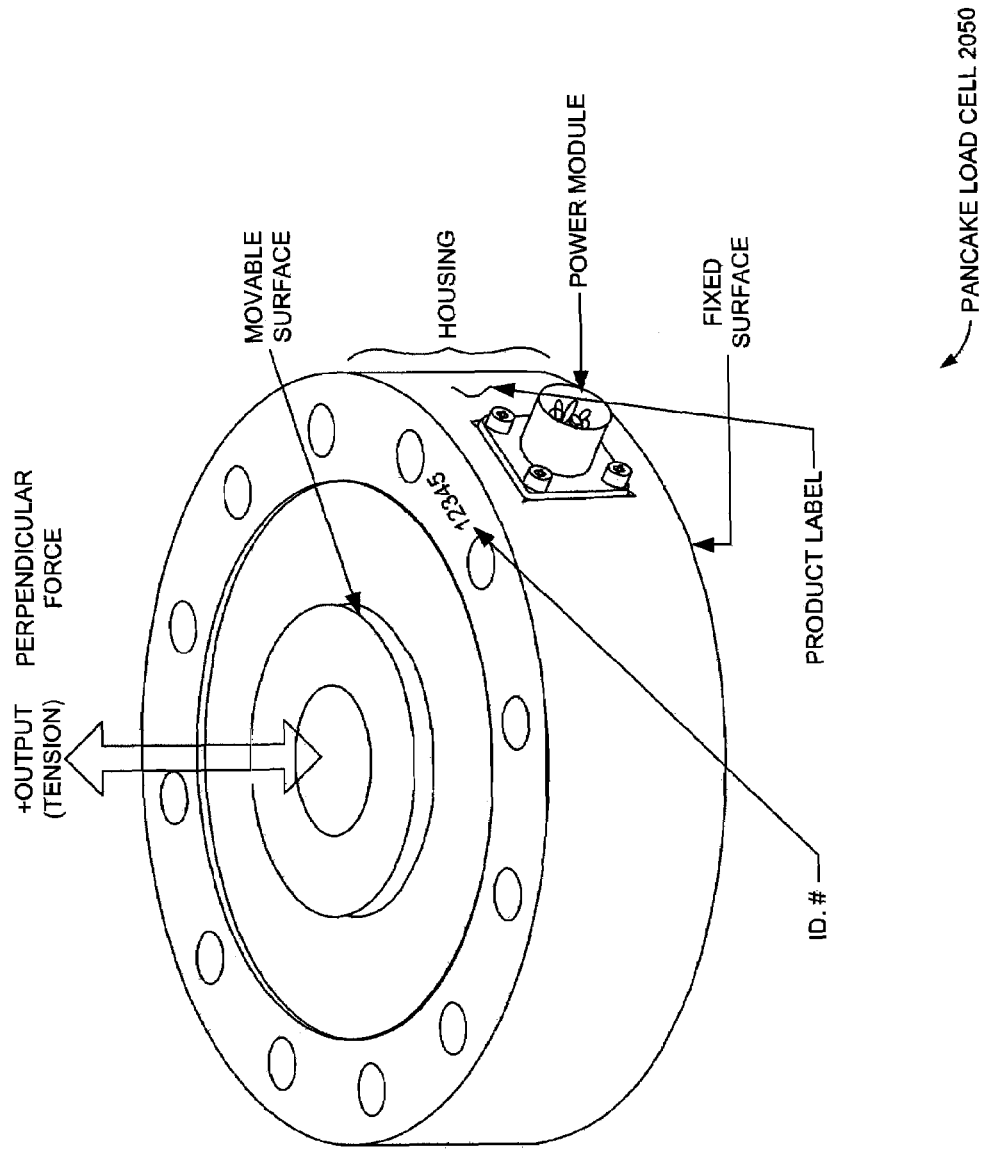

FIG. 20 illustrates a Pancake load cell, according to one embodiment.

Figure 21:
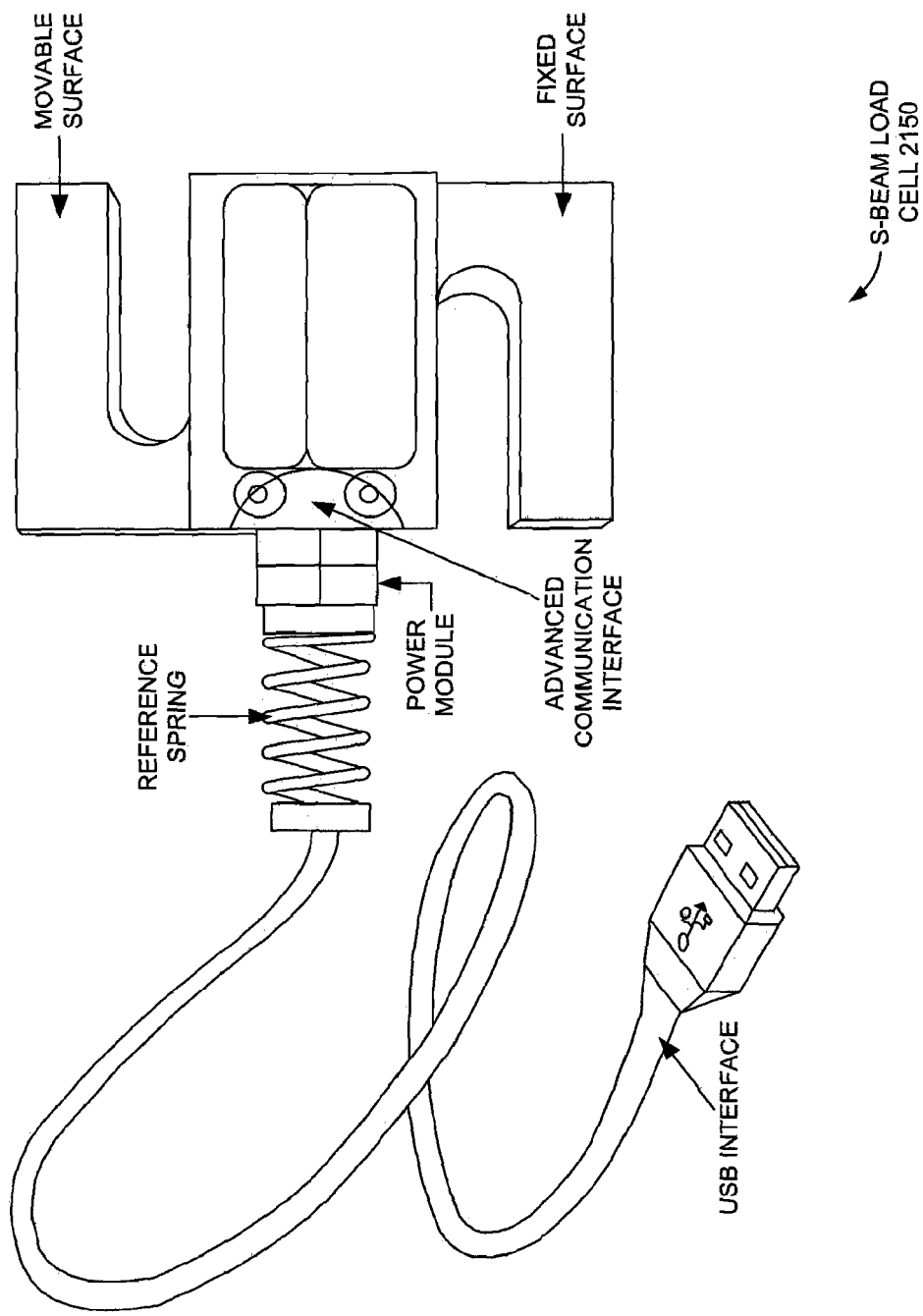

FIG. 21 illustrates an S-beam load cell with a USB connection, according to one embodiment.

Figure 22:
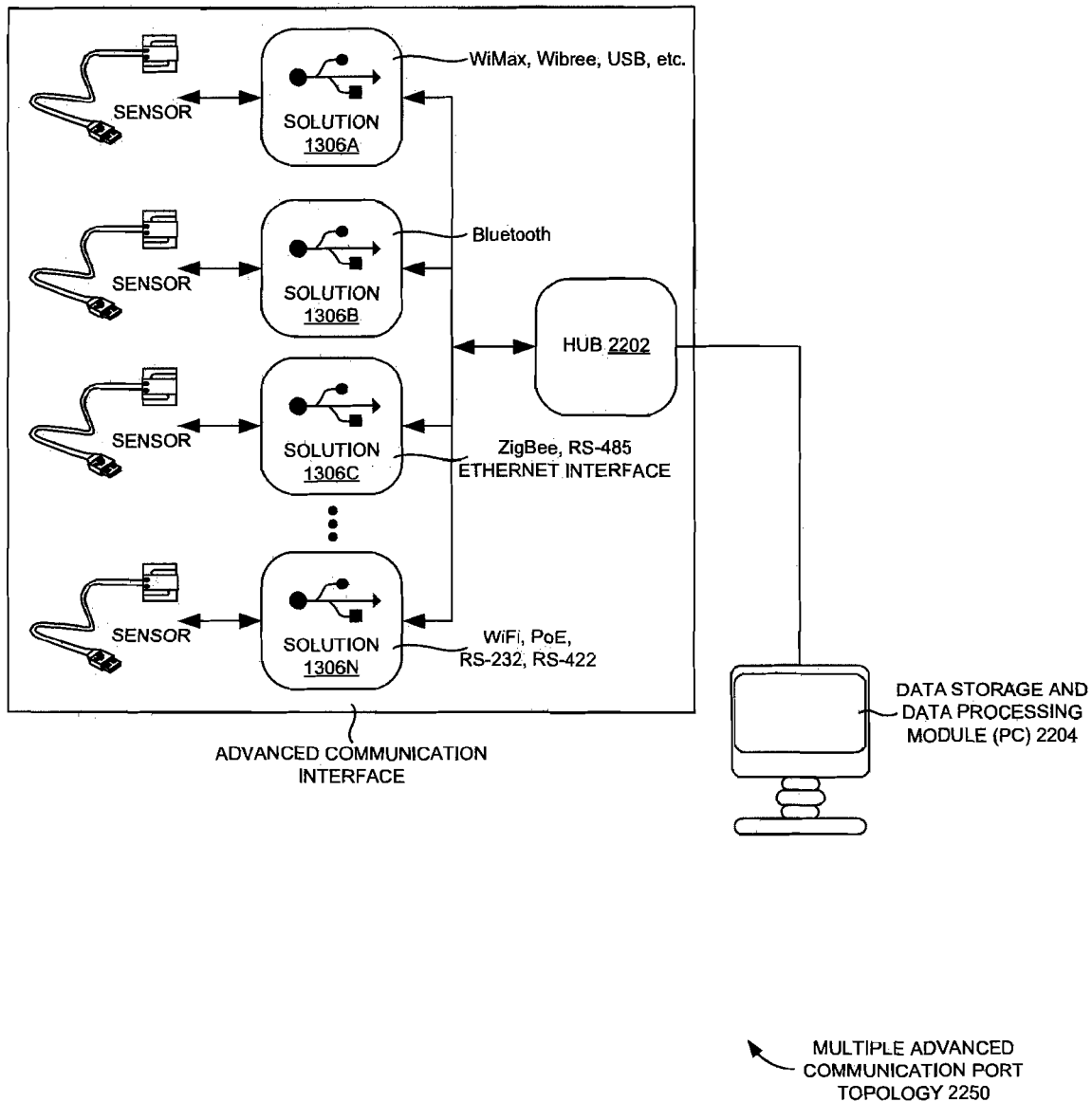

FIG. 22 illustrates a multiple type of an advanced communication port topology, according to one embodiment.

Figure 23:
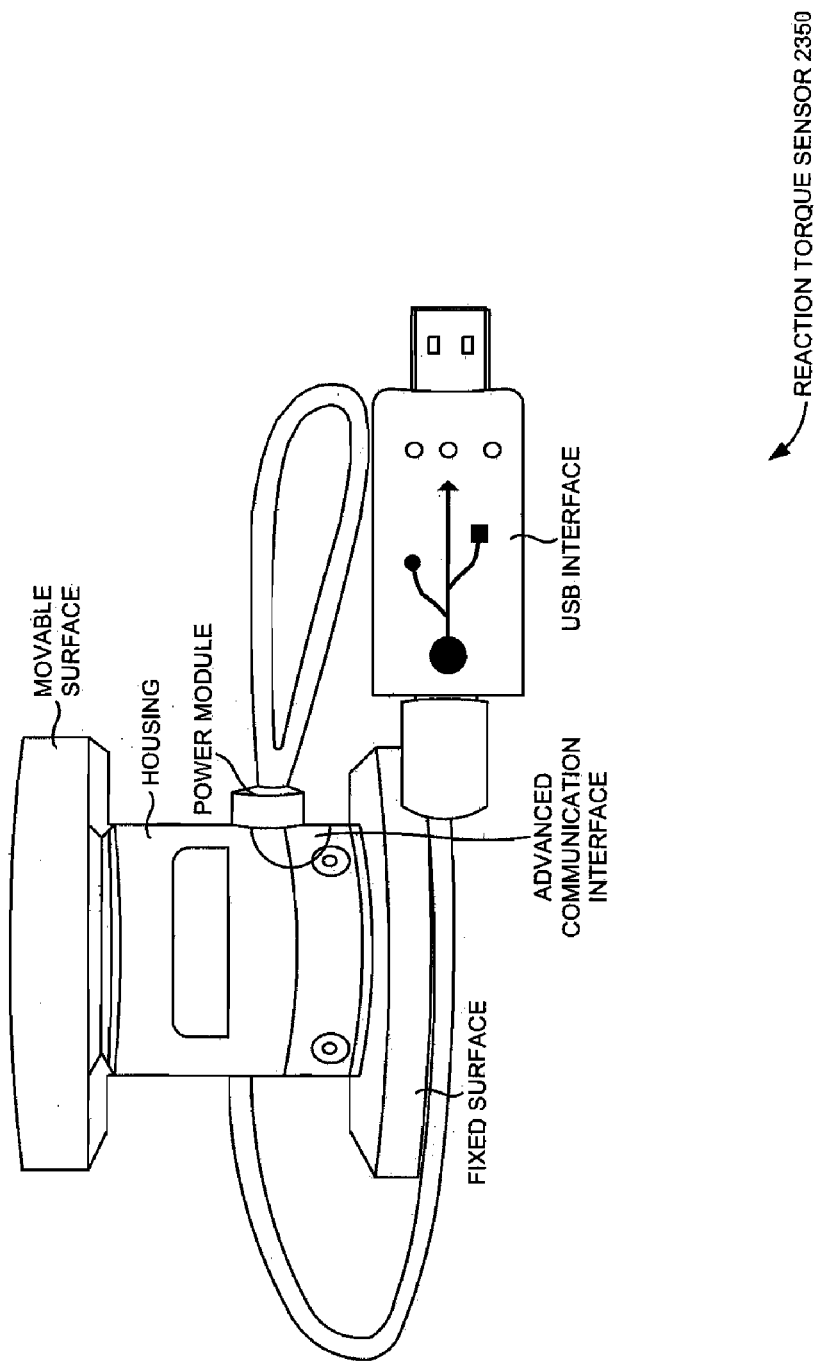

FIG. 23 illustrates a reaction torque sensor with a USB digital interface option, according to one embodiment.

Figure 24:
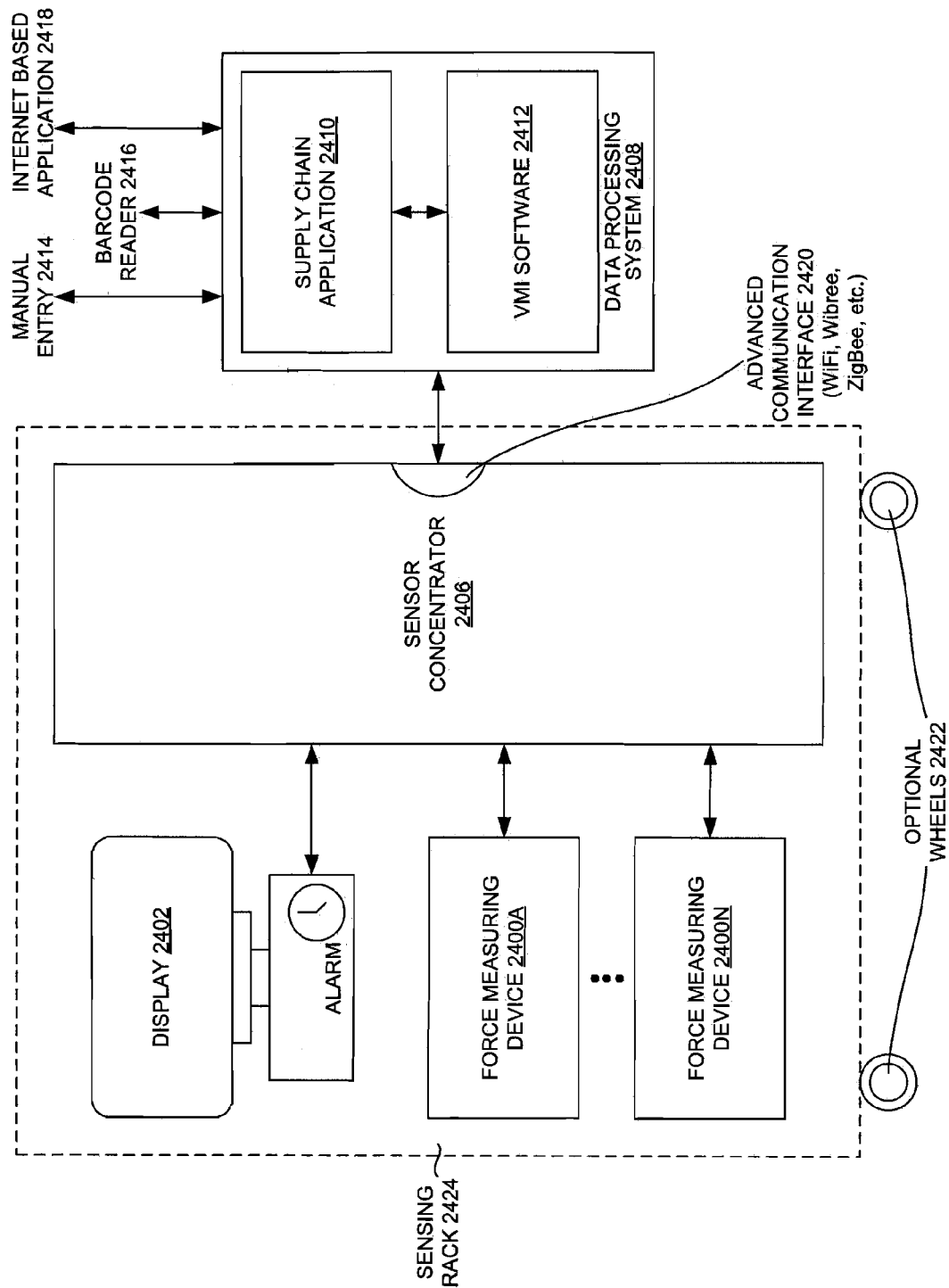

FIG. 24 illustrates a sensing rack with a sensor concentrator, according to one embodiment.

Figure 25:
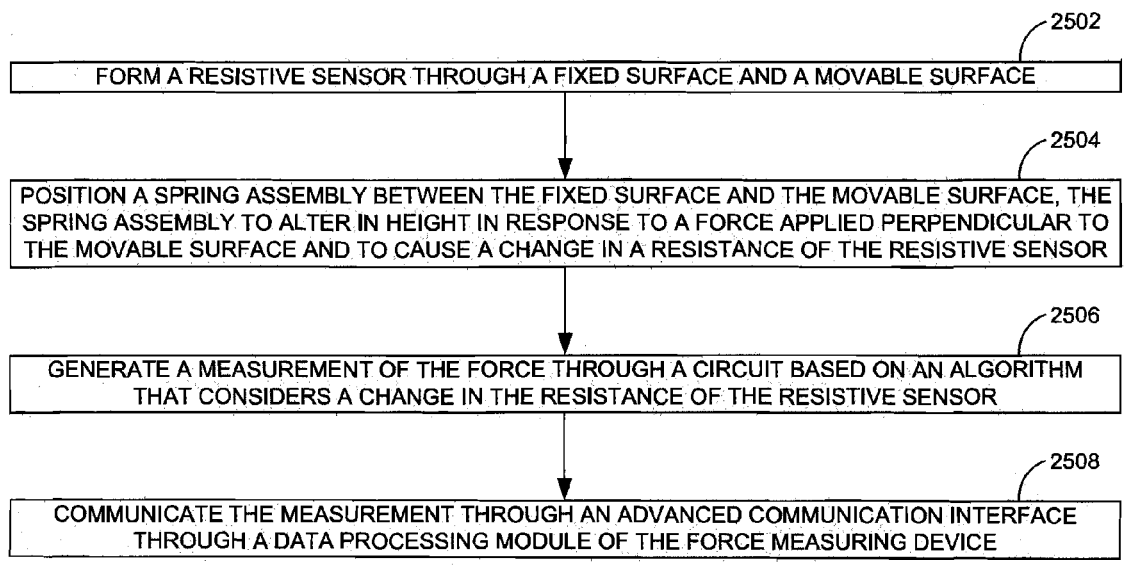

FIG. 25 illustrates a process flow of measuring the change through a sensor and using an advanced communication interface and capturing, storing and analyzing the data.

Other features of the present embodiments will be apparent from accompanying Drawings and from the Detailed Description that follows.

DETAILED DESCRIPTION

Example embodiments, as described below, may be used to provide high-accuracy, low-cost, force sensing devices (e.g., load sensor, pressure sensor, etc.). It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

A spring assembly, which overcomes the problems of relaxation, creep, hysteresis, set, and/or off-axis loading, is disclosed in one embodiment. The spring assembly in its various embodiments has the property that when a force is applied to the spring assembly, the spring assembly deflects both longitudinally (e.g., along a direction of the applied force) and perpendicularly to the direction of the applied force. However, at the points where the spring assembly contacts other surfaces and/or layers, the perpendicular deflection is negligible, which reduces the problem of friction and, therefore, hysteresis. A member may include at least one of a spring assembly positioned between a fixed surface and a movable surface.

The various embodiments of a spring assembly may be used in different types of force measuring devices (e.g., a gap-change sensing device, an area-change sensing device, etc.). The spring assembly may include a conical washer. The conical washer may provide several substantial advantages. The conical washer may have a large base (e.g., 3×) compared to a height thereof combined with a large flat top surface, which makes it unlikely that the applied force will cause the movable surface to suffer off-axis loading, thereby rendering the movable surface non-parallel. Further, metals may be less susceptible to set and creep than other materials.

In another embodiment, a spring assembly may include two conical washers placed back to back in such a way that a top surface and/or a bottom surface are wide, but not as wide as the middle. In another embodiment, the spring assembly may include multiple pairs of conical washers placed back to back. Yet another embodiment of a spring assembly includes multiple sets of conical washers placed base to base, each set including at least one conical washer.

The various embodiments of a spring assembly may be used in different types of force measuring devices (e.g., a gap-change sensing device, an area-change sensing device, etc.). In a gap-change sensing device, the spring assembly can be positioned between the fixed surface and the movable surface which is substantially parallel to a fixed surface. When a force is applied perpendicular to the movable surface, the height of the spring assembly may be changed, and this may cause change in a gap between the fixed surface and the movable surface. The change in the gap between the fixed surface and the movable surface may cause a change in an electrical property (at least one of conductance, resistance and inductance) between the fixed surface and the movable surface, which can algorithmically be measured as a force.

In an area-change sensing device, a sensor may have a fixed surface and a movable surface substantially parallel to the fixed surface, the fixed layer being perpendicular to the fixed surface, and at least a spring assembly, positioned between the movable surface and the fixed layer, being caused to alter in height in response to a force applied adjacent to the movable surface, and to cause a change in an overlap area between the fixed surface and the movable surface, and a circuit to determine a measurement based on an algorithm that considers a change in an electrical property when the overlap area changes.

A few embodiments of a spring assembly have been shown in FIGS. 1-4 by way of illustration. The various embodiments of the spring assembly may be used in different types of force measuring devices (including, e.g., a gap-change sensing device, an area-change sensing device, etc.).

Figure 1:
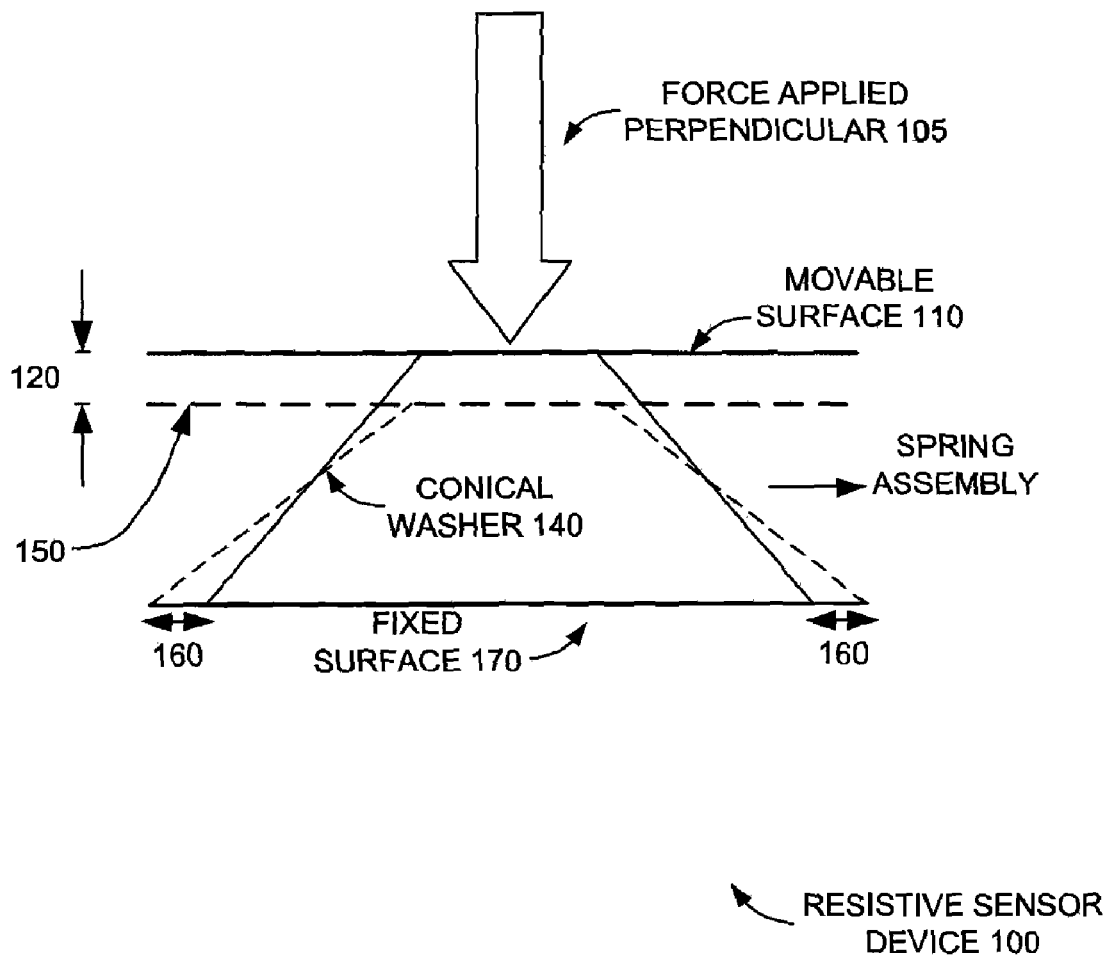
FIG. 1 illustrates a cross-sectional view of a resistive sensor device, with a conical washer positioned between a fixed surface and a movable surface, and exhibiting a deflection in response to an applied force, according to one embodiment.

FIG. 1 illustrates a cross-sectional view of a resistive sensor device 100, with a conical washer 140 positioned between a fixed surface 170 and a movable surface 110, and exhibiting a deflection in response to an applied force 105, according to one embodiment. The conical washer 140 may have an inside edge that is wider than an outside edge, and may be made of metal (e.g., metals may be less susceptible to set and creep than other materials). In alternate embodiments, the conical washer 140 may be created from a synthetic material (e.g., a polymer based material). The conical washer 140 may deflect both in a longitudinal 120 (along axis) and perpendicular 160 (perpendicular to axis) direction to the direction of the unknown applied force 105. When the force 105 is applied to the conical washer 140, the movable surface 110 shifts to the position 150. The force 105 may be applied in perpendicular direction. A spring assembly may be positioned between the fixed surface 170 and the movable surface 110 that is substantially parallel to the fixed surface 170.

At the points where the conical washer is in contact with other surfaces and/or layers (e.g., the movable surface 110), the perpendicular deflection (e.g., perpendicular to the direction of a force 105) may be negligible. This may reduce friction and, therefore, hysteresis. The fixed surface 170 and the movable surface 110 may be painted (e.g., sputtered, coated) on multiple non-conductive printed circuit boards (e.g., the printed circuit boards 502, 506, and 510 of FIG. 5). The conical washer 140 may have a large base compared to a height thereof. In addition, a large flat top surface may make it unlikely that applied force will cause off-axis loading.

Figure 2:
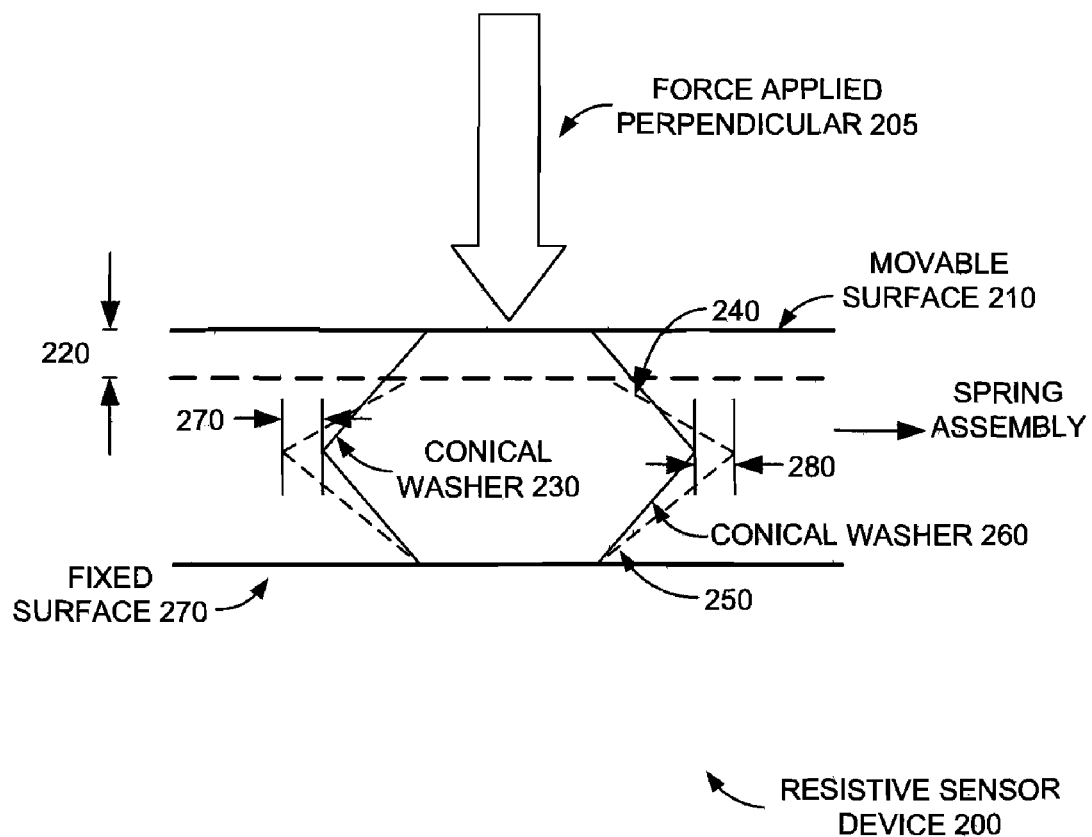
FIG. 2 illustrates a cross-sectional view of a sensor device, with two metal conical washers positioned back to back between a fixed surface and a movable surface, according to one embodiment.

FIG. 2 illustrates a cross-sectional view of a sensor device 200, with two conical washers positioned back to back between a fixed surface 270 and a movable surface 210, according to one embodiment. A first conical washer 230 and a second conical washer 260 may be placed back to back in such a way that a top surface and a bottom surface are wide, but not as wide as the middle. As perpendicular force 205 is applied against the movable surface 210, it may cause a longitudinal deflection 220 in the sensor device 200, and perpendicular deflections 270 and 280 in the conical washers 230 and 260. However, at the points where the conical washer 230 contacts the movable surface 110 and where the conical washer 260 contacts the fixed surface 170, perpendicular deflections 240 and 250 are negligible, which may reduce the problem of friction and, therefore, hysteresis. The conical washers 230 and 260 may be bonded together using an adhesive and/or glue in one embodiment. In an alternate embodiment, the conical washers 230 and 260 may be welded together.

Figure 3:
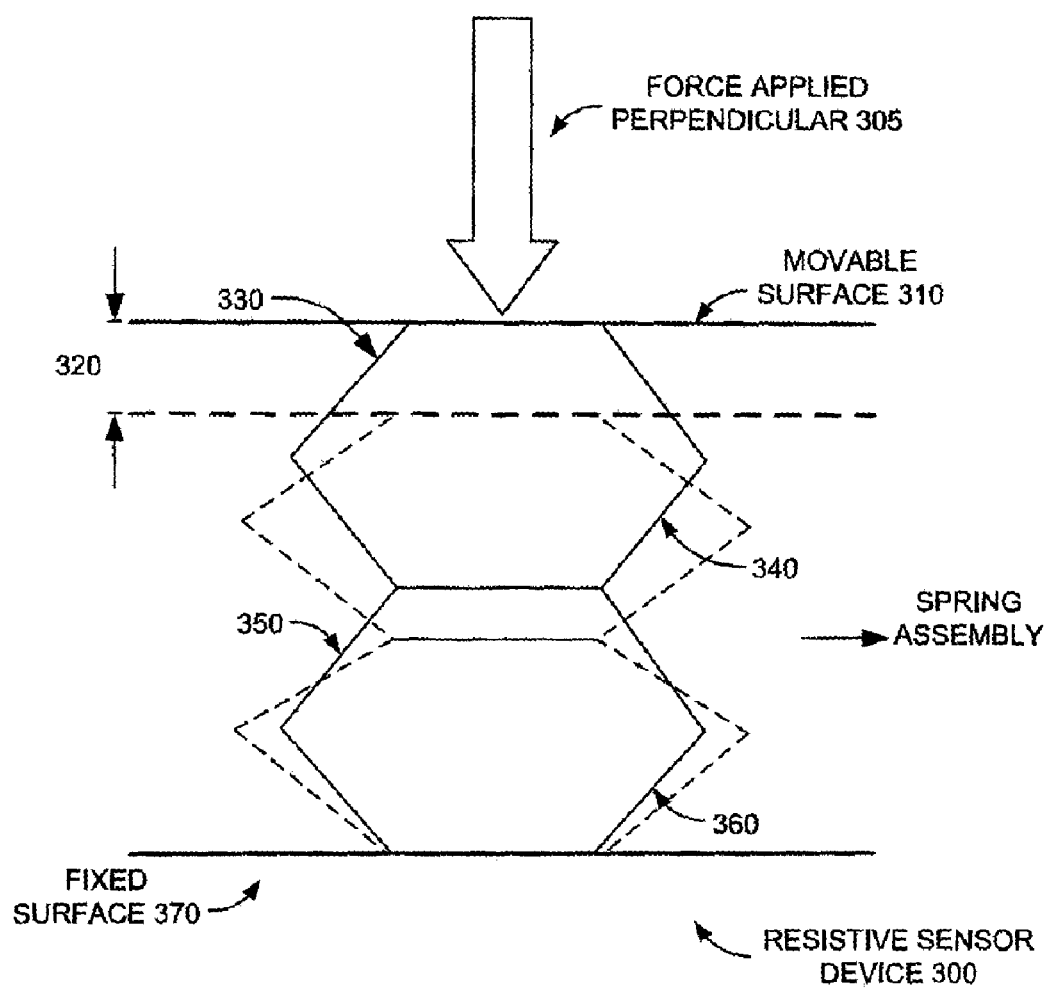
FIG. 3 illustrates a cross-sectional view of a resistive sensor device, with multiple conical washers positioned back to back between a fixed surface and a movable surface, according to one embodiment.

FIG. 3 illustrates a cross-sectional view of a resistive sensor device 300, with multiple conical washers positioned back to back between the fixed surface 370 and a movable surface 310, according to one embodiment. As a force 305, akin to the applied force 105 of FIG. 1, is applied in perpendicular direction against a movable surface 310, it causes longitudinal deflection 320 in a spring assembly, and perpendicular deflections in conical washers 330, 340, 350, and 360. However, at the points where the conical washer 330 contacts the movable surface 310, where the conical washer 360 contacts a fixed surface 370, and also where the conical washer 340 contacts the conical washer 350, perpendicular deflections may be negligible.

Figure 4:
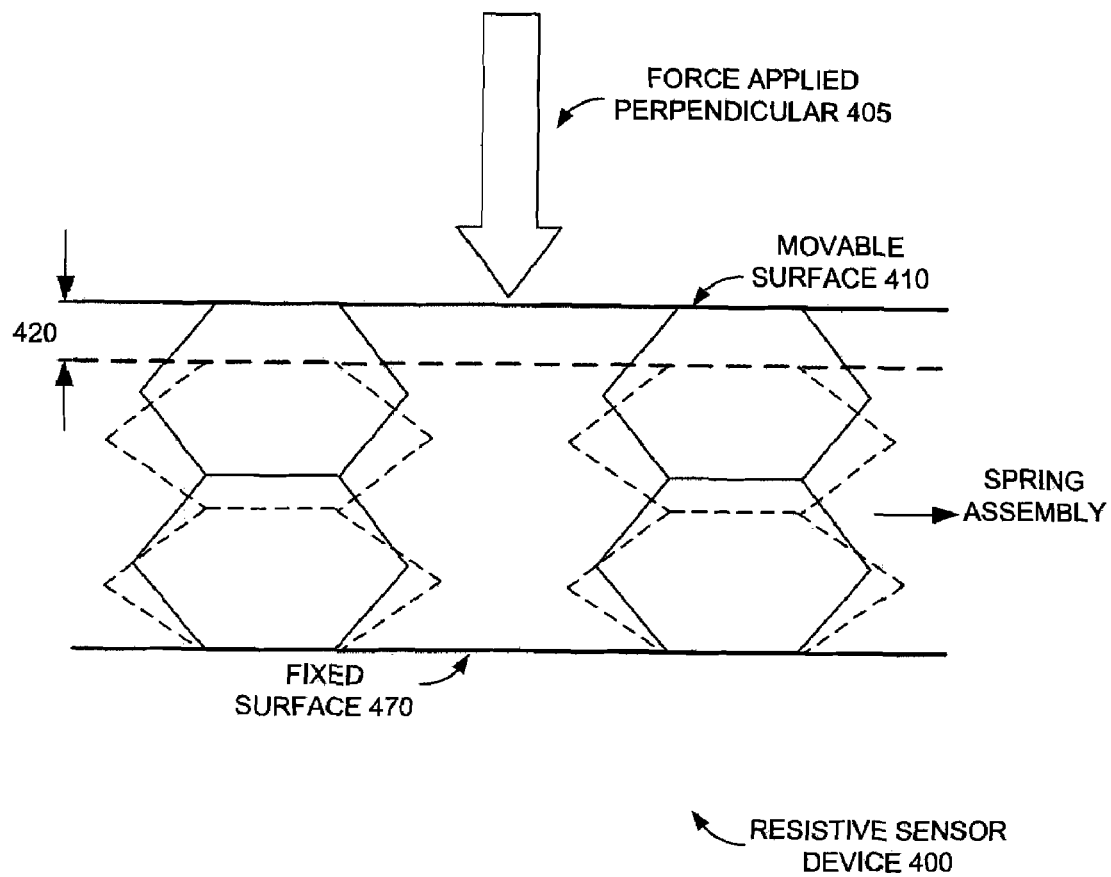
FIG. 4 illustrates a cross-sectional view of a resistive sensor device, with multiple sets of multiple conical washers positioned back to back between a fixed surface and a movable surface, according to one embodiment.

FIG. 4 illustrates a cross-sectional view of a resistive sensor device 400, with multiple sets of multiple conical washers positioned back to back between a fixed surface 470 and a movable surface 410, according to one embodiment. In particular, FIG. 4 illustrates a resistive sensor device 400 in which multiple sets (e.g., one set may have two washers) of conical washers are placed base to base (e.g., back to back), with each set including at least one conical washer. As a force 405, also shown in FIG. 1, is applied against a movable surface 410, it may cause longitudinal deflection 420 in the resistive sensor device 400, and perpendicular deflections in all conical washers, similar to perpendicular deflections shown in FIGS. 2 and 3. The resistive sensor device 300 of FIG. 3 and the resistive sensor device 400 of FIG. 4 illustrate different configurations of the sensor device 200 of FIG. 2 that may be employed to provide further advantages in various applications (e.g., higher load measurement capacity, lesser likelihood of off-axis loading).

In a gap-change sensing device, the spring assembly (e.g., assembly of conical washers 330, 340, 350, and 360 of FIG. 3) may be positioned between the fixed surface (e.g., a fixed surface 170 of FIG. 1) and the movable surface (e.g., a movable surface 110 of FIG. 1) that is substantially parallel to the fixed surface. When force 105 is applied perpendicular to the movable surface 110, it causes change in a gap between the fixed surface 170 and the movable surface 110. The change in the gap between the fixed surface 170 and the movable surface 110 may cause a change in the electrical property between the fixed surface 170 and the movable surface 110. The gap-change sensing device may generate a measurement based on the change in electrical property of a sensor resulting from a change in the gap between the fixed surface 170 and the movable surface 110. A reference sensor may be used to adjust the measurement based on at least one environmental condition.

Figure 5:
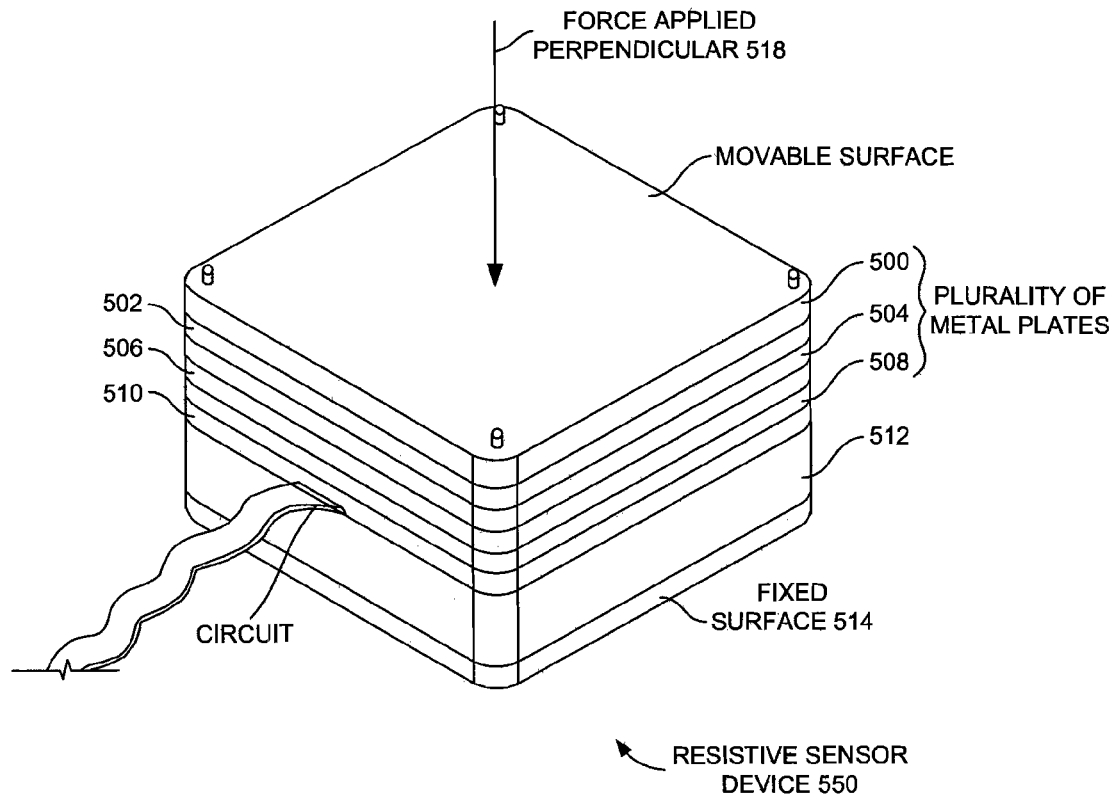
FIG. 5 illustrates a three-dimensional view of a resistive sensor device having a sensor inside the housing, according to one embodiment.

FIG. 5 illustrates a three-dimensional view of a resistive sensor device 550 having a sensor (e.g. formed by a fixed surface 170 and a movable surface 110 of FIG. 1) and a reference sensor (e.g., formed by the surface 622 of FIG. 6C and the surface 628 of FIG. 6E), according to one embodiment. The resistive sensor device 550 of FIG. 5 includes a top layer 500, a printed circuit board 502, 506, 510, a spring assembly 504, a spacer 508, a shielding spacer 512, and a fixed surface 514. The top layer 500, the spring assembly 504, and the spacer 508 may be one or more of metal plates. The bottom layer may be the fixed surface 514. A cable (e.g., an interface cable) may connect the resistive sensor device 550 to a data processing system. In addition, a force 518 (e.g., a load, a weight, a pressure, etc.) may be applied to the top layer 500 in perpendicular direction. The various components of the resistive sensor device 550 are best understood with reference to FIG. 6A-6G.

Figure 6A:
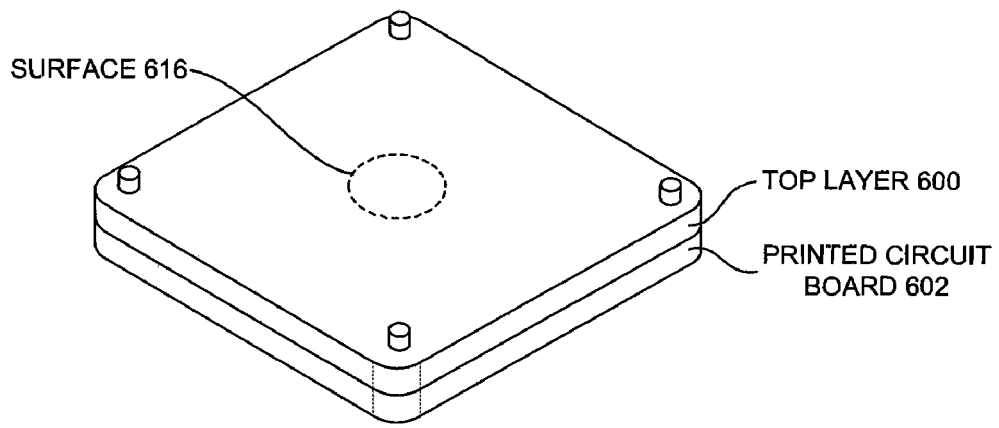
FIGS. 6A-6G illustrates the exploded views of a resistive sensor device of FIG. 5, according to one embodiment.
Figure 6B:
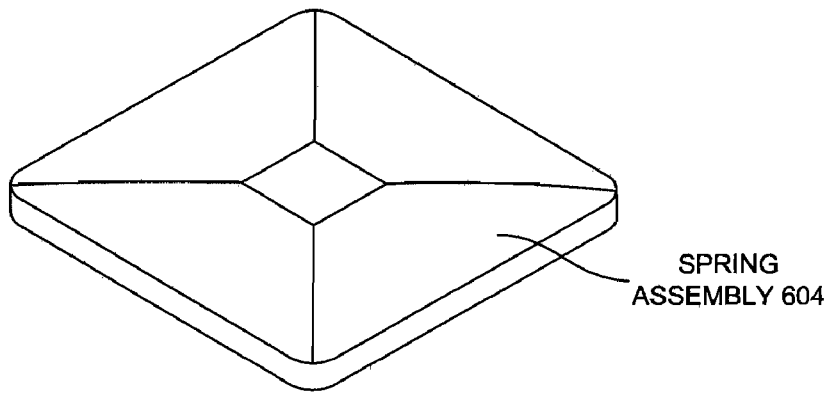
Figure 6C:
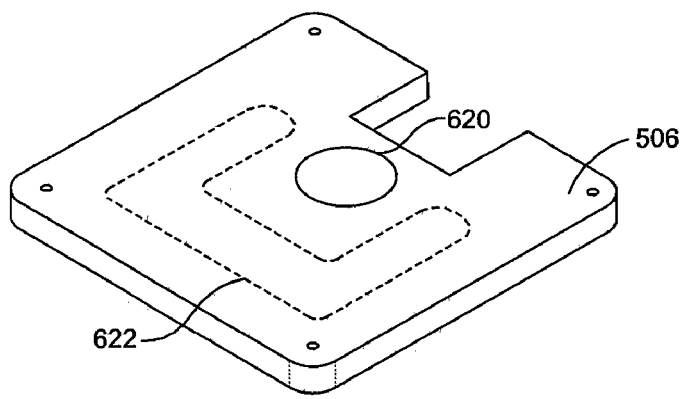

FIGS. 6A-6G illustrates exploded views of the resistive sensor device 550 of FIG. 5, according to one embodiment. FIG. 6A illustrates a top layer 600 and a printed circuit board 602. The top layer 600 may be created from a material such as aluminum, steel, and/or a plastic, etc. The printed circuit board 602 includes a surface 616. The surface 616 may be painted (e.g., sputtered, coated, etc.) on the printed circuit board 602. The printed circuit board 602 may be coupled (e.g., screwed onto, bonded, etched, glued, affixed, etc.) to the top layer 600 as illustrated in FIG. 6A. When the force 518 (e.g., as illustrated in FIG. 5) is applied to the top layer 600, the height of a spring assembly 604 as illustrated in FIG. 6B is reduced. This may result change in a gap between the surface 616 and a surface 620 as illustrated in FIG. 6C separated by the spring assembly 604.

FIG. 6C illustrates a cross-sectional view of the printed circuit board 506 (e.g., a non-conductive material). In the embodiment illustrated in FIG. 6C, a surface 620 (e.g., a conductive surface) is painted (e.g., coated, sputtered, etc.) on the printed circuit board 506 on one side. In addition, a surface 622 may be painted on the other side of the printed circuit board 506 as illustrated in FIG. 6C. The surface 616 may be painted (e.g., sputtered, coated, etc.) on the printed circuit board 506. The change in a gap between the surface 616 and the surface 620 may cause a change in electrical property of a sensor. The sensor may be formed by the surface 616 and the surface 620 separated by the spring assembly 604.

In one embodiment, the surface 616 and the surface 620 are substantially parallel to each other, and have the same physical area and/or thickness. The change in electrical property of the sensor may be inversely proportional to the change in the distance between the surface 616 and the surface 620 in one embodiment. For example, the change in capacitance of the sensor may be inversely proportional to the change in distance.

The spring assembly 604 of FIG. 6B may be coated with an insulating material at the ends where it comes in contact with the fixed surface 620 and the movable surface 616 (e.g., to avoid a short circuit). In one embodiment, the spring assembly 604 may be created from a conductive synthetic material rather than solely one or more metals. A spring assembly 604 may create a gap between the surface 616 and the surface 620. The gap can be filled with air or any other gas (e.g., an inert gas). A conductive material may be stretched to the limits of elasticity such that an increase in length and decrease in width may cause an increase in resistance. The aforementioned increase in resistance may be sensed and, therefore, for example, the change in resistance of an appropriate sensor may be directly proportional to the change in length and inversely proportional to the change in cross-sectional area.

Figure 6D:
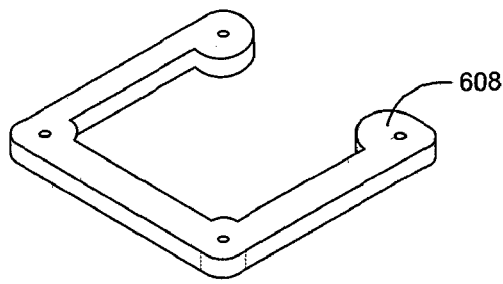
Figure 6E:
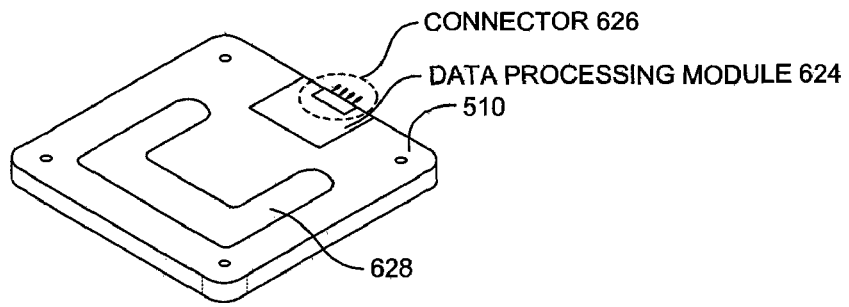

The surface 622 as illustrated in FIG. 6C and the surface 628 as illustrated in FIG. 6E may be separated by the spacer as illustrated in FIG. 6D. The surface 622 and the surface 628 may form a reference sensor according to one embodiment. Since the surface 622 and the surface 628 may not alter positions with respect to each other, when a force 518 is applied to a top layer 600, the electrical property thereof may not change. The electrical property is calculated as "electrical property=(dielectric constant multiplied by area of overlap) divided by (distance between surfaces)") in response to the applied force 518.

As such, the reference sensor formed by the surface 622 and the surface 628 may experience a change in electrical property due to environmental factors. The environmental factors may be at least one of a humidity in a gap between the first surface and the second surface, a temperature of a resistive sensor device 550, and an air pressure of an environment surrounding a resistive sensor device 550. Therefore, the effect of these environmental conditions can be removed from a measurement of a change in electrical property of a sensor. The sensor may be formed by the surface 616 and the surface 620 when a force 518 is applied to a resistive sensor device 550 to more accurately determine the change in the electrical property of the sensor.

The data processing module 624 as illustrated in FIG. 6E of a resistive sensor device 550 may be used to generate a measurement based on a change in a distance between the surface 616 of FIG. 6A and the surface 620 of FIG. 6C (e.g., through coupling a resistive sensor device 550 through a connector 626 of FIG. 6E with the shielding spacer 512 of FIG. 5). In addition, the data processing module 624 may generate a measurement of the sensor after removing an effect of the environmental condition from an electrical property of a sensor (e.g., by subtracting the changes in a reference sensor, which may be only affected by environmental conditions).

Figure 6F:
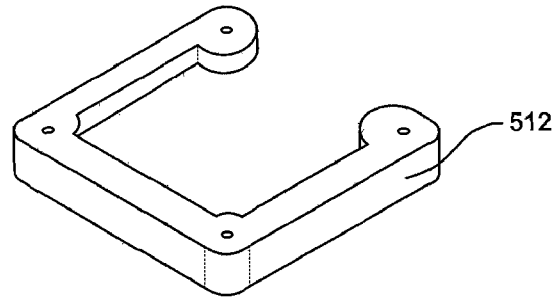
Figure 6G:
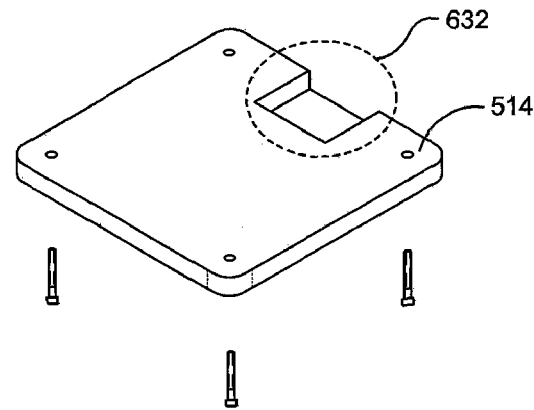

The shielding spacer 512 as illustrated in FIG. 6F may separate the printed circuit board 510 from a fixed surface 514 (e.g., to minimize an effect of a stray electrical property affecting the measurement). The fixed surface 514 is illustrated in FIG. 6G. The various components illustrated in FIGS. 6A-6G may physically connect to each other to form the resistive sensor device 550 in one embodiment (e.g., in alternate embodiments the various components may be screwed together, welded together, bound together, etc.).

The spring assembly 604 of the resistive sensor device 550 of FIG. 5 in different embodiments may include one or more conical washers. According to one embodiment, the spring assembly 604 of the resistive sensor device 550 may include one conical washer, as illustrated in FIG. 1. According to another embodiment, the spring assembly 604 of the resistive sensor device 550 may include a pair of conical washers, as illustrated in FIG. 2. According to another embodiment, the spring assembly 604 of the resistive sensor device 550 may include multiple pairs of conical washers stacked on top of each other, as illustrated in FIG. 3. According to yet another embodiment, the spring assembly 604 of the resistive sensor device 550 may include multiple sets of conical washers, each set including at least one conical washer, as illustrated in FIG. 4.

Figure 7:
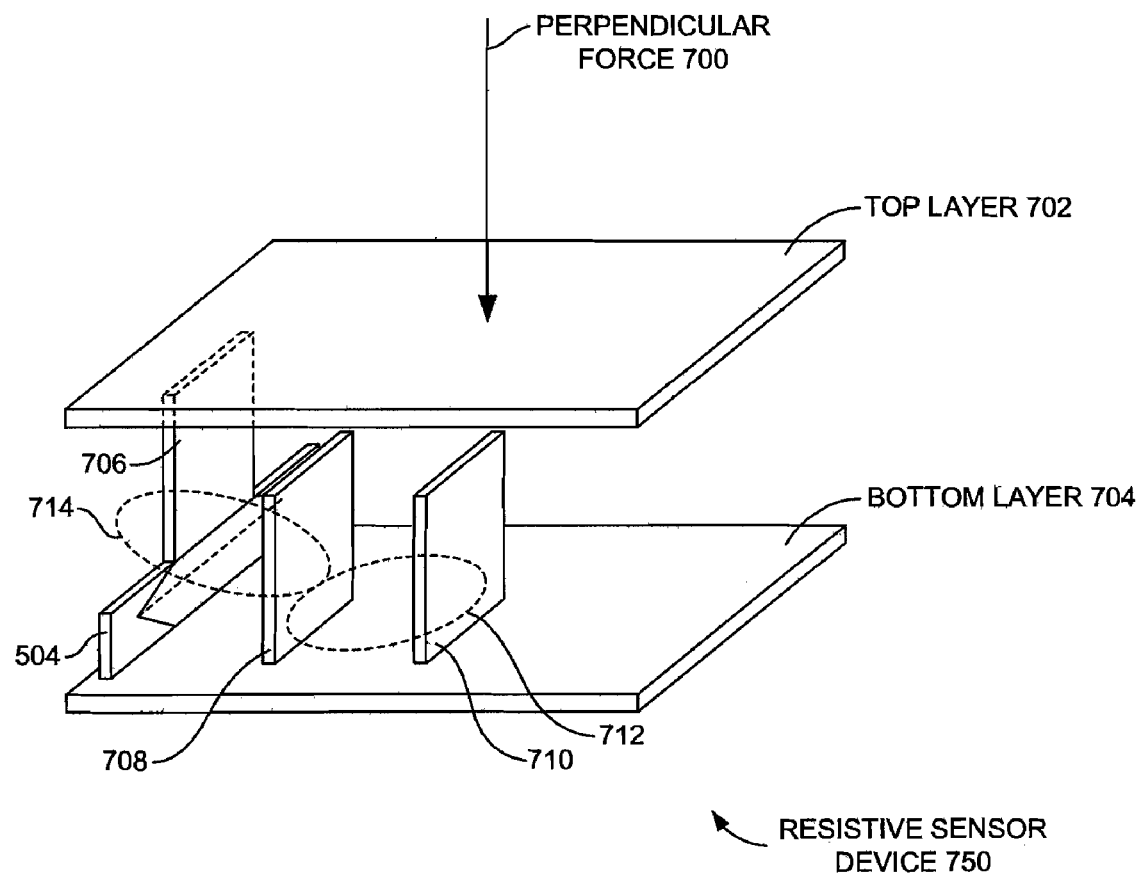
FIG. 7 illustrates a sensor device formed by two substantially parallel surfaces and a spring assembly positioned between a top layer and bottom layer, according to one embodiment.

FIG. 7 illustrates a sensor device 750 formed by two substantially parallel surfaces, and a spring assembly positioned between a top layer 702 and a bottom layer 704, according to one embodiment. The sensor device 750 includes the top layer 702 (e.g., a conductive and/or non-conductive substrate) and the bottom layer 704 (e.g., a conductive and/or nonconductive substrate), according to one embodiment. The top layer 702 may be a movable surface. The bottom layer 704 may be a fixed surface. Perpendicular force 700 is applied to the top layer 702 in FIG. 7. The top layer 702 includes a movable surface 706 perpendicular to the top layer 702. The bottom layer 704 includes a surface 708 and a surface 710, both the surfaces being perpendicular to the bottom layer 704.

The movable surface 706 substantially perpendicular to the fixed layer (e.g., bottom layer 704), but is not directly in contact with the fixed layer, the device being positioned between the movable surface 706 and the fixed layer (e.g., bottom layer 704). Movable surfaces 706 and 708 (e.g., the surface 706 and the surface 708 may be substantially parallel to each other) to form a sensor 714 (e.g., the sensor 714 may be a variable capacitor formed because two conductive surface plates are separated and/or insulated from each other by an air dielectric between the surface 706 and the surface 708) in an area that overlaps the surface 706 and the surface 708. The surface 706 may be movable relative to the surface 708 in one embodiment. In addition, a reference sensor 712 is formed between the surface 708 and the surface 710 (e.g., a reference surface). The surface 710 may be substantially parallel to the surface 706 and/or with the surface 708 in one embodiment. In addition, the surface 710 may be electrically coupled to the surface 706 and/or the surface 708. Since the surface 708 and the surface 710 may not alter positions with respect to each other when a perpendicular force 700 is applied to the top layer 702, the electrical property thereof may not change.

The spring assembly 504 of the sensor device 750 of FIG. 7 in different embodiments may include one or more conical washers. According to one embodiment, the spring assembly 504 of the sensor device 750 may include one conical washer, as illustrated in FIG. 1. According to another embodiment, the spring assembly 504 of the sensor device 750 may include a pair of conical washers, as illustrated in FIG. 2. According to another embodiment, the spring assembly 504 of the sensor device 750 may include multiple pairs of conical washers stacked on top of each other, as illustrated in FIG. 3. According to yet another embodiment, the spring assembly 504 of the sensor device 750 may include multiple sets of conical washers, each set including at least one conical washer, as illustrated in FIG. 4.

Figure 8:
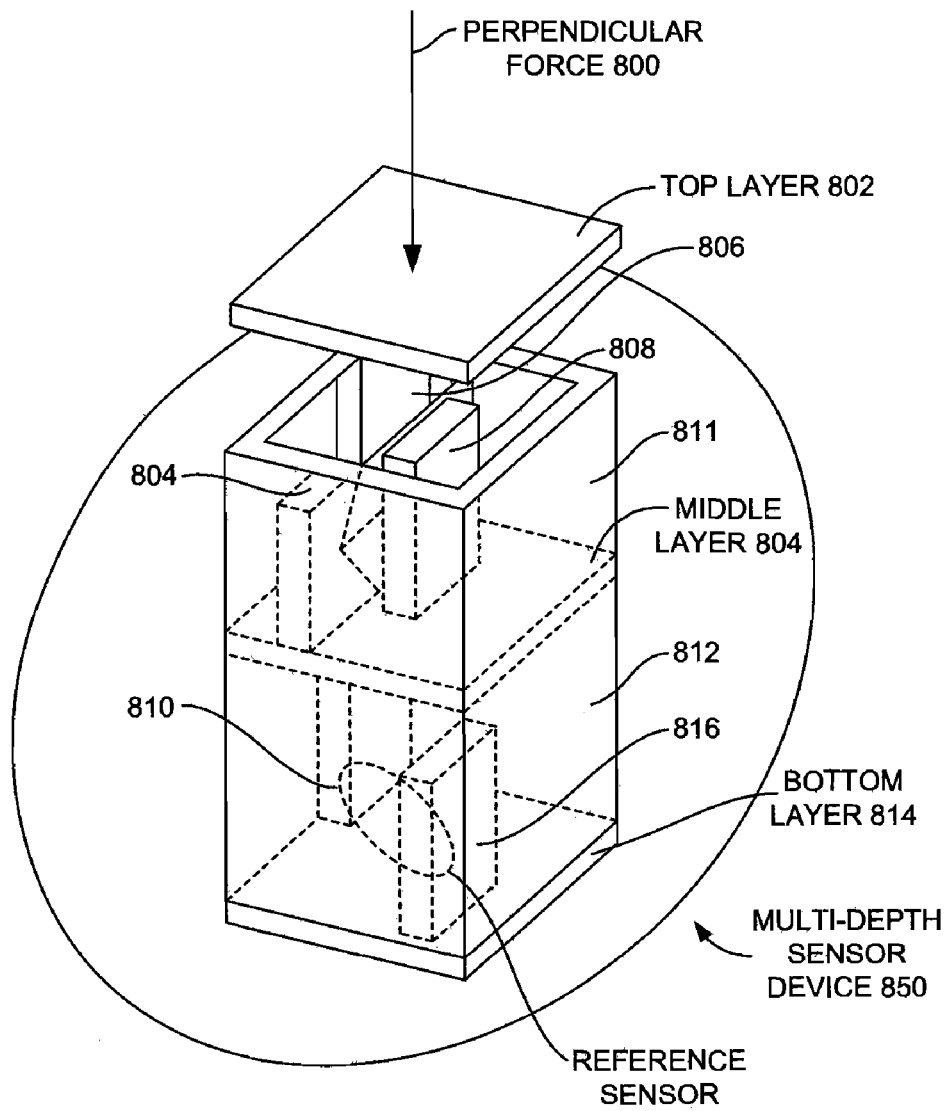
FIG. 8 illustrates a multi-depth sensor device, according to one embodiment.

FIG. 8 illustrates a multi-depth device 850, according to one embodiment. In FIG. 8, a top layer 802, a middle layer 804, and a bottom layer 814 are illustrated. The middle layer 804 may be a fixed surface. The top layer 802 includes a plate 806 (e.g., a conductive surface). The plate 806 may be electrically separated from the top layer 802 by the application of an insulating material between an area of affixation between a top layer 802 and the plate 806. A perpendicular force 800 may be applied to the top layer 802 and the plate 806 to cause the plate 806 to deflect (e.g., move inward once a load and/or force 800 is applied to the top layer 802, as illustrated in FIG. 8). The movable surface 806 is substantially perpendicular to the middle layer 804, but is not directly in contact with the middle layer, the device being positioned between the movable surface 806 and the middle layer 804.

The middle layer 804 includes a plate 808 and a plate 810. In one embodiment, the middle layer 804 may include two separate layers bonded together, with each having either the plate 808 or the plate 810. The bottom layer 814 includes the plate 816. In one embodiment, there may be a shielding spacer (e.g., not shown, but the shielding spacer may be any type of spacer) between a reference sensor (e.g., formed by the plate 810 and the plate 816) and a bottom of the housing (e.g., bottom layer 814) to minimize an effect of a stray electrical property affecting the measurement (e.g., a height of the shielding spacer may be at least ten times larger than a plate spacer between plates of the reference sensor and between plates of a sensor in one embodiment to minimize the stray electrical property). The plate 806 and the plate 808 may form a sensor (e.g., as formed by a fixed surface 170 and a movable surface 110 of FIG. 1). Similarly, the plate 810 and the plate 816 may form a reference sensor (e.g., as formed by the plate 810 and the plate 816).

A spacer 811 may be used to physically separate the top layer 802 from the middle layer 804. In one embodiment, a spring assembly 804 (e.g., conical back to back springs) may be placed between (e.g., in the outer periphery between) the top plate 802 of FIG. 8 and the housing 811 of FIG. 8. The spacer 812 may be used to physically separate the middle layer 804 from a bottom layer 814. The multi-depth device 850 may be easier to manufacture according to one embodiment because of modularity of a design thereof (e.g., various manufacturing techniques can be used to scale the multi-depth device 850 with a minimum number of sub-assemblies) in that various subassemblies may each include only one surface (e.g., a top layer 802, the middle layer 804, and the bottom layer 816 may include only one plate).

Figure 9:
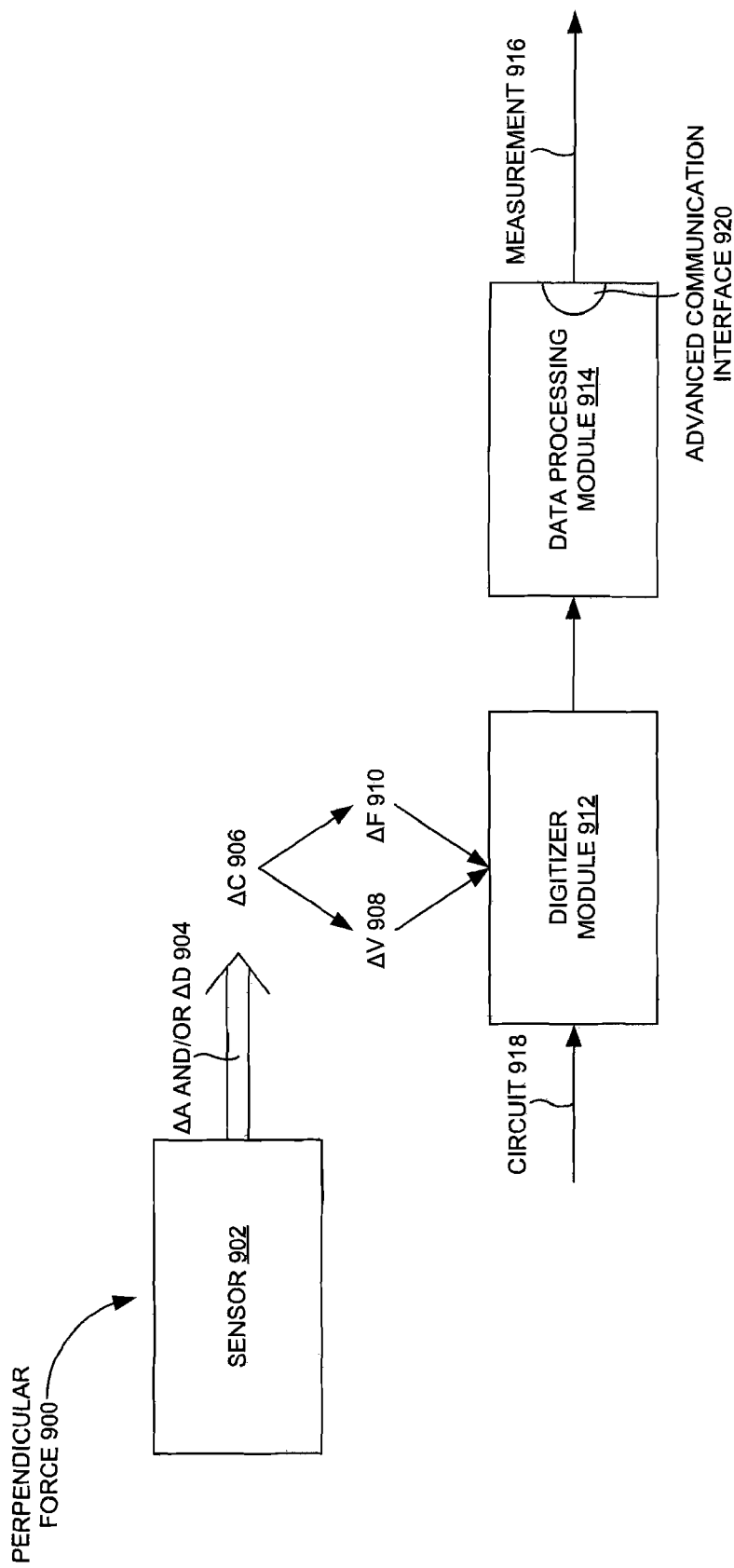
FIG. 9 illustrates a process view to automatically generate a measurement based on a change in a gap and/or a change in an overlap area between a fixed surface and a movable surface, according to one embodiment.

FIG. 9 illustrates a process view to automatically generate a measurement based on a change in a gap and/or a change in an overlap area between a fixed surface and a movable surface, according to one embodiment. In particular, FIG. 9 is a process view of measuring a perpendicular force 900, according to one embodiment. In FIG. 9, the force 900 may be applied to a sensor 902 (e.g., applied force 518 of FIG. 5, or applied force 700 of FIG. 7), according to one embodiment. An electronic circuitry (e.g., a software and/or hardware code) may apply an algorithm to measure a change in a distance between the surface 616 and the surface 620 forming a sensor as illustrated in FIG. 6A and FIG. 6C (e.g., the sensor 902 may include a spring assembly 504 of FIG. 5 and/or any one or more of the devices 100, 200, 300, and 400 of FIGS. 1-4) when a force 518 of FIG. 5 is applied to a resistive sensor device 550. In an alternate embodiment, a change in area between the surfaces may be considered rather than a change in a gap (e.g., the change in an overlap area between the surface 706 and the surface 708 forming a sensor as illustrated in FIG. 7).

Next, a change in electrical property 906 may be calculated based on the change in a gap between the surfaces forming a sensor or change in the overlap area between the surfaces forming a sensor. The change in electrical property 906, a change in a voltage 908, and/or a change in a frequency 910 may also be calculated to generate a measurement (e.g., an estimation of a force 900 applied to the sensor 902).

The change in electrical property ($\Delta C$) 906 data, the change in voltage ($\Delta V$) 908 data, and/or the change in frequency ($\Delta F$) 910 data may be provided to a digitizer module 912 (e.g., an analog-to-digital converter).

The circuit 918 may generate a measurement 916 of the perpendicular force 900 based on an algorithm that may consider a change in the electrical property of the sensor 902. Finally, the digitizer module 912 may work with a data processing module 914 (e.g., a microprocessor which may be integrated in the data processing module) to convert the change in electrical property ($\Delta C$) 906 data, the change in voltage ($\Delta V$) 908 data, and/or the change in frequency data ($\Delta F$) 910 to a measurement reading 916. The data processing module 914 of a force measuring device may communicate the measurement 916 through an advanced communication interface 920. The advanced communication interface 920 may be at least one of a USB interface, a Bluetooth interface, a Zigbee interface, a WiFi interface, WiMax, Wibree, RS-232, and RS-422.

Figure 10:
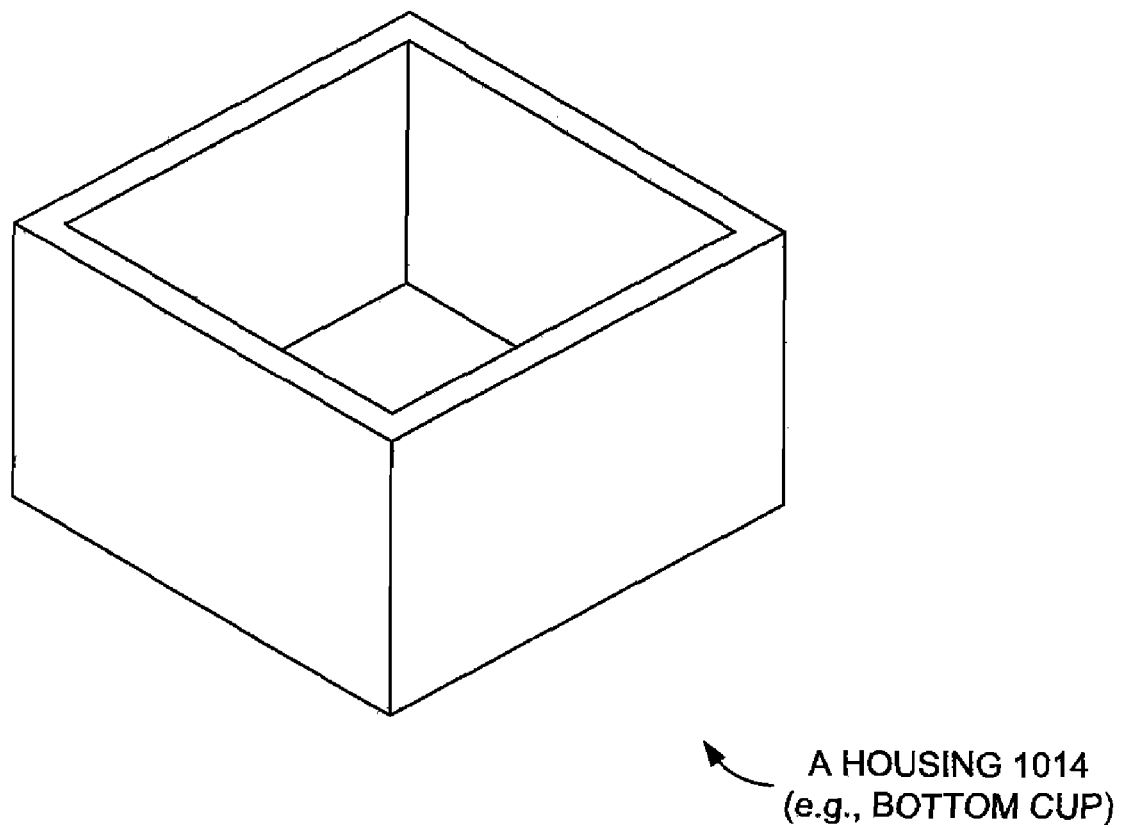
FIG. 10 illustrates a three-dimensional view of a housing that can be used to encompass a sensor and a reference sensor, according to one embodiment.

FIG. 10 is a three-dimensional view of a carved material that can be used to encompass (e.g., provide a housing to) a sensor (e.g., a sensor 714 as illustrated in FIG. 7 and a reference sensor (e.g., a reference sensor 712 illustrated in FIG. 7) in a boxed device, according to one embodiment. In FIG. 10, a single block (e.g., steel) is used to form a bottom cup 1014. In one embodiment, the bottom cup 1014 in FIG. 10 replaces a bottom layer of a boxed device, and encompasses the various structures (e.g., capacitive surfaces/plates, spacers, etc.) between a bottom layer and a top plate.

The bottom cup 1014 may be formed from a single piece of metal through any process (e.g., involving cutting, milling, etching, and/or drilling, etc.) that maintains the structural and/or tensile integrity of the bottom cup 1014. This way, the bottom cup 1014 may be able to withstand larger amounts of force (e.g., the force 105 of FIG. 1) by channeling a force downward through walls of the bottom cup 1014.

Figure 11:
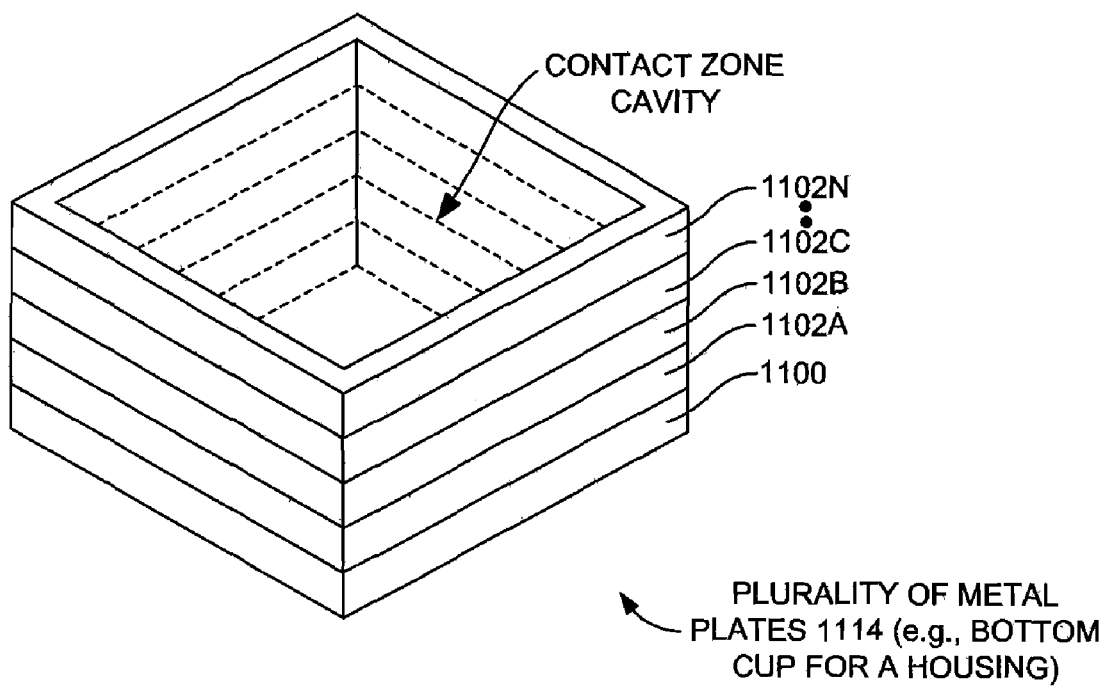
FIG. 11 illustrates a three-dimensional view of a multiple layers for a housing that can be used to encompass a sensor and a reference sensor in a boxed device, according to one embodiment.

FIG. 11 is a three-dimensional view of multiple layers of a material that can be used to encompass a sensor and a reference sensor in a boxed device, according to one embodiment. Particularly, FIG. 11 illustrates a bottom cup 1114 formed with multiple blocks of material, according to one embodiment. A single thin solid metal block may form a bottom layer 1100 as illustrated in FIG. 11. In addition, other layers of a bottom cup 1114 may be formed from layers (e.g., the layers 1102A-1102N) each laser cut (e.g., laser etched) and/or patterned (e.g., to form the bottom cup 1114 at a cost lower than milling techniques in a single block as may be required in the bottom cup 1014 of FIG. 10). For example, the layers 1102A-

1102N may be a standard metal size and/or shape, thereby reducing the cost of fabricating the bottom cup 1114.

In one embodiment, the bottom cup 1114 in FIG. 11 replaces the bottom layer of a boxed device, and encompasses the various structures (e.g., capacitive/resistive/inductive surfaces/plates, spacers, etc.) between a bottom layer and a top plate. Like in the embodiment of FIG. 10, a bottom cup 1114 of FIG. 11 may be able to withstand larger amounts of force (e.g., the force 105 of FIG. 1) by channeling a force downward through the walls of a bottom cup 1114. Furthermore, the bottom cup 1114 may be less expensive to manufacture than the bottom cup 1014 as described in FIG. 10 because standard machining techniques may be used to manufacture the bottom cup 1114.

Figure 12:
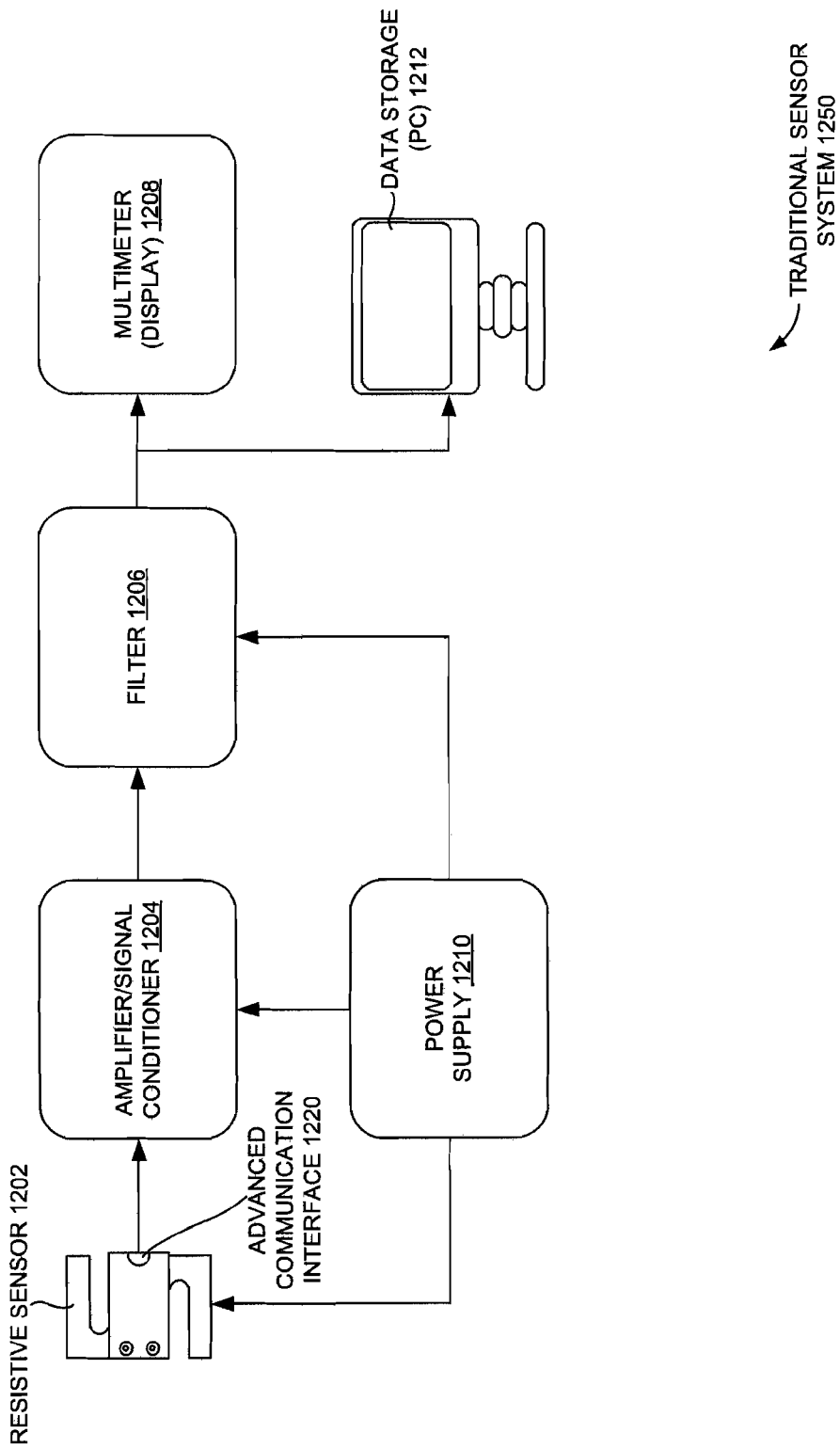
FIG. 12 illustrates a process view of a traditional sensor system that generates a measurement of a force, based on an algorithm, according to one embodiment.

FIG. 12 is a process view of a traditional sensor system 1250 that generates a measurement of a force, based on an algorithm, according to one embodiment. In particular, FIG. 12 illustrates a resistive sensor 1202, an amplifier/signal conditioner 1204, a filter 1206, a multi-meter 1208, a power supply 1210, and an advanced communication interface 1220, according to one embodiment. Amplifier/signal conditioner 1204 may amplify a signal provided by the resistive sensor 1202. At the signal conditioning stage, the signal is manipulated in such a way that it meets the requirements of the next stage (e.g., filter stage) for further processing. The filter 1206 may be an electronic circuit which may perform signal processing functions, specifically to remove unwanted frequency components from the signal.

Amplifier/signal conditioner 1204 with an active analog filter 1206 may require an external power supply 1210 to generate a measurement of a force. The measurement of force is based on an algorithm that may consider a change in an electrical property between a fixed surface and a movable surface, according to one embodiment. The multi-meter 1208 may include features such as ability to measure voltage, current and resistance. The measured value may be stored in the data storage 1212.

Traditional sensor systems had some shortcomings including power consumption, unwanted noise, and voltage drop out, which would occur if the cable range between an amplifier and the display instrument was too long. Even if we disregard the economic factor behind such a platform, the task of integrating these instruments is difficult.

Figure 13:
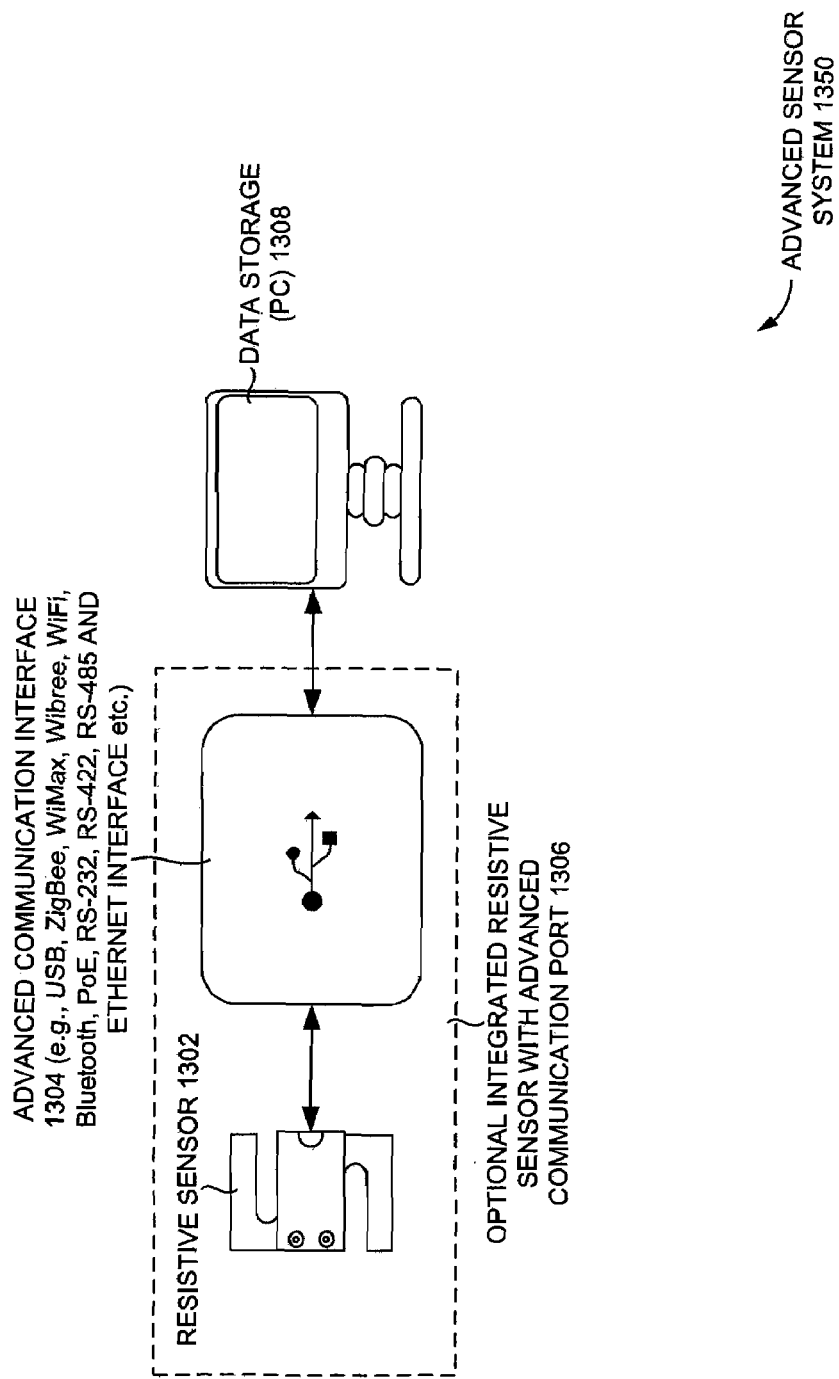
FIG. 13 illustrates a system view of an advanced sensor system, according to one embodiment.

FIG. 13 is a system view of an advanced sensor system 1350, according to one embodiment. In particular, FIG. 13 illustrates an optional integrated resistive sensor with advanced communication port 1306 and data storage 1308, according to one embodiment. The optional integrated resistive sensor with the advanced communication port 1306 may include a resistive sensor 1302 and an advanced communication interface 1304. An advanced sensor system 1350 may use advanced communication technology such as USB, ZigBee, WiFi, Bluetooth etc. The advanced communication interface 1304 may capture data from a sensor. For example, the sensor may be the resistive sensor 1302 (for e.g. but not limited to S-Beam sensor, Pancake Sensor, Reaction torque sensor etc.). Wibree interface is a new short range wireless standard for enabling wireless connectivity between small devices. The new Wibree technology has been developed by the Nokia Research Centre. The Wibree interface standard may provide ultra low peak, average and idle mode power consumption. The Wibree interface standard may also provide ultra low cost and small size for accessories and Human Interface Devices (HID). In addition, the Wibree interface provides minimal cost and size to mobile phones, PCs and secures multi-vendor interoperability. Wibree interface standard may also complement other local wireless connectivity technologies, and consume significantly less power. This may particularly, enable for use in small electronics items such as button cell powered devices where power is limited. The WiMax technology is based on the IEEE 802.16 standard (also called Broadband Wireless Access). The WiMax interface may provide interoperability of the existing standards between 802.16-2004 and 802.16e-2005. For example, WiMAX interface may be connected with an IP based core network, which is typically chosen by operators serving as Internet Service Providers (ISP). However, the WiMax interface may provide seamless integration capabilities with other types of architectures as with packet switched Mobile Networks. WiMax may use a mechanism based on connections between the base station and the user device. Each connection may be based on specific scheduling algorithms. Wi-Fi may have a Quality of service (QoS) mechanism similar to fixed Ethernet, where packets can receive different priorities based on their tags. For example VoIP traffic may be given priority over web browsing. Hence, WiMax interface architecture may be designed into various hardware configurations rather than fixed configurations. For example, the architecture is flexible enough to allow remote/mobile stations of varying scale and functionality and Base Stations of varying size (e.g. femto, pico, and mini base station as well as macros). Wibree interface and WiMax interface may be used a solution for inventory management system. According to yet another embodiment, the data processing module of the force measuring device may communicate a measurement through an advanced communication interface with a multiple advanced communication port topology, as illustrated in FIG. 22.

Figure 14A:
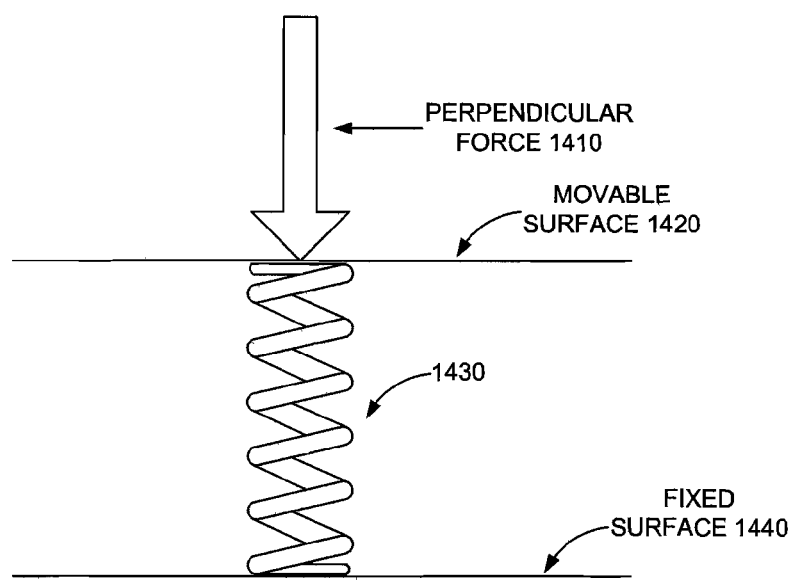
FIG. 14A illustrates an example of one embodiment that shows two sensor parallel to each other, separated by a helical spring, and perpendicular force applied in a manner, along the original axis of a sensor.

FIG. 14A illustrates an example of one embodiment that shows two sensors parallel to each other, separated by a helical spring and a perpendicular force applied along an original axis of the sensor. In an example embodiment, off-axis loading occurs when the direction of applied force is not along the initial axis of a sensor. Off-axis loading may cause the capacitive plates to become nonparallel and significantly impact the measured electrical property, and hence the load. Referring to FIG. 14A, a perpendicular force 1410 is applied along the original axis of the sensor. Since the perpendicular force 1410 is applied along the initial axis of the sensor, a movable surface 1420 and a fixed surface 1440 remain parallel.

Figure 14B:
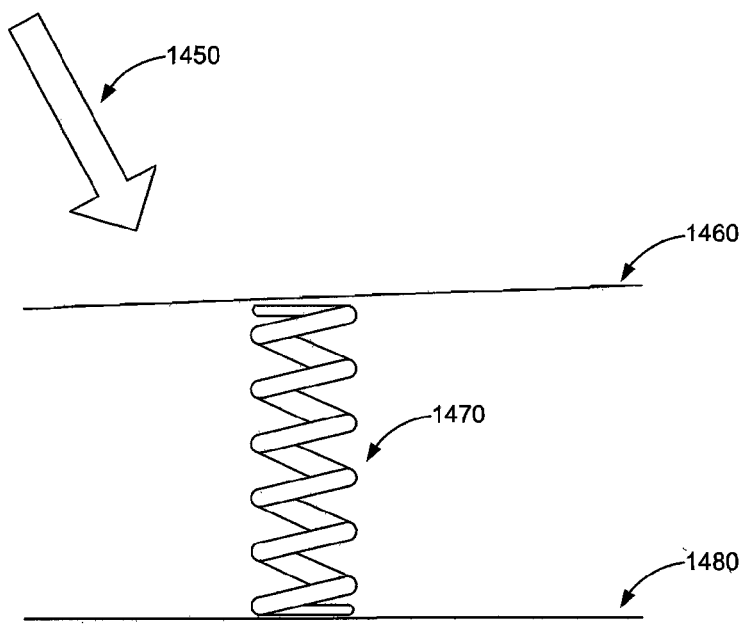
FIG. 14B illustrates an example of an another embodiment that shows two sensor parallel to each other, separated by a helical spring and a force applied in a manner, not along the original axis of a sensor.

FIG. 14B illustrates an example of an another embodiment that shows two sensor parallel to each other, separated by a helical spring and a force applied in a manner, not along the original axis of a sensor. Referring to FIG. 14B, a force 1450 is applied in a manner, not along the original axis of a sensor. Consequently, a movable plate 1460 rotates in a manner that renders the movable plate 1460 perpendicular to the direction of the force 1450, and no longer parallel to the fixed surface 1480. Many traditional springs such as helical springs (made from polymers, i.e., rubber or plastic) tend to suffer from all of the above constraints, and, consequently, require special attention and design changes for building a consistently accurate sensor.

FIG. 15A-B illustrates an example embodiment of a capacitive force sensing device, according to one embodiment. Referring to FIG. 15A-B, one embodiment of a capacitive force sensing device includes an electrical property meter 1510. The two parallel plates 1520 and 1525 may be separated by a helical spring 1530. In one embodiment the helical spring may be a resistive element. The electrical property meter 1510 may be connected via wires 1540. Parallel plate 1520 is a fixed base member, whereas parallel plate 1525 is moveable. The force sensing device has an electrical property that is based upon the area of the dielectric characteristics of air as well as the volume encompassed by electrical property plates 1520 and 1525. The basic electrical property formula is:

C=kA/d, where C represents electrical property, k represents the dielectric of the material(s) between the plate 1520 and 1525, A represents area encompassed by the plates, d represents the distance between the electrical property plates 1520 and 1525.

Referring to FIG. 15B, when an unknown load (e.g., force, weight, pressure, etc.) 1550 is applied to electrical property plate 1525, a spring contracts as per the following formula: F=k$_1$Δd, where F represents a force applied, k$_1$ represents the characteristic of a spring, and Δd represents amount of deflection. Thus, by measuring the electrical property before and after an unknown load 1550 is applied, the force is easily determined.

FIG. 16 is a perspective view of an S-beam load cell in tension and compression, according to one embodiment. In particular, FIG. 16 illustrates the S-beam load cell 1600, an output (tension) 1602, a flexible strain relief 1604, a thread size 1606, an ID. number 1608, a power module 1612, a wiring code label 1614, a reference spring 1616, a movable surface 1610, a fixed surface 1660 and an advanced communication interface 1620, according to one embodiment.

The load cell may be a device (e.g., a transducer) that converts a force to a differential signal (e.g., a differential electric signal). The load cell may be used for a variety of industrial applications (e.g., a scale, a truck weighing station, a tension measuring system, a force measurement system, a load measurement system, etc.). A force measuring device is an S-Beam load cell 1600 that provides the measurement under tension and/or compression mode. For example, the force measuring device may be a cantilever sensor. The force measuring device may be used in an inventory management system. The inventory management system may be at least one of a transportation operator, a manufacturer, a distributor, and a retailer through an internet based software application that provides the measurement as an inventory level. The inventory level may be at least one of a dry bulk goods inventory level, a discrete parts inventory level, and a volume based inventory level.

The output (e.g., tension) 1602 may be the magnitude of the pulling force exerted by a string, cable, chain, or similar object on another object. The thread may be a particular type of fitting used to connect flexible hoses and rigid metal tubing that carry fluid. The thread size 1606 may measure amount of fluid in the thread. The S-beam load cell 1600 may include an ID number 1608 and the wiring code label 1614.

FIG. 17 illustrates a top view of S-Beam load cell 1600 of FIG. 16, according to one embodiment.

FIG. 18 illustrates the side view of S-Beam load cell 1600 of FIG. 16, according to one embodiment. The performance of a spring is characterized by the relationship between the loads (F) applied and the resulting deflections (δ), the deflections of a compression spring being reckoned from the unloaded free length. The F-δ characteristic is approximately linear and the slope of the characteristic is defined as the stiffness of a spring K=F/δ. The non-loading surface 1806 to be contacted is illustrated in the side view of the S-beam load cell 1600. In an example embodiment, for 25 to 300 pounds (lb), a spring strain relief may be used. In another embodiment, for 500 to 10000 lb, a liquid tight strain relief may be used.

FIG. 19 illustrates a tabular format of different dimensions as shown in FIG. 18 and respective capacity in relation to thread type and weight, according to one embodiment.

FIG. 20 illustrates a Pancake load cell, according to one embodiment. Particularly, FIG. 20 illustrates the Pancake load cell 2050 with multiple shear struts, a female thread through the center, and multiple through holes on the outer ring for mounting. The Pancake load cell 2050 may include a plug and play advanced communication technology option.

Pancake load cells 2050 may be used to measure both tension and compression for capacities of 500 to 10,000 lb of force. Load cells in this category feature a tough anodized aluminum or stainless steel exterior with bolt-down holes, and available with metric thread configurations. Pancake load cells are available with or without a tension base. The ring like contact zone cavity arrangement may provide the potential of including plug and play advanced communication interface option.

FIG. 21 illustrates an S-beam load cell with a USB connection, according to one embodiment. Particularly, FIG. 21 illustrates the S-Beam load cell as a force measuring device that provides the measurement under a tension and/or a compression mode, and uses advanced communication interface. The S-beam USB load cell 2150 may include a movable surface, a fixed surface, and a reference spring. The USB may be a serial bus standard to connect devices to a data processing unit. The USB was designed to allow many peripherals to be connected using a single standardized interface socket, and to improve plug and play capabilities by allowing hot swapping. For example, the USB may allow devices to be connected and disconnected without rebooting the data processing unit or turning off the device. Other convenient features of the USB may include providing power to low-consumption devices, eliminating the need for an external power supply, and allowing many devices to be used without requiring manufacturer specific device drivers to be installed.

FIG. 22 illustrates the multiple advanced communication port topology, according to one embodiment. In particular, FIG. 22 illustrates a hub 2202, a data storage 2204, a WiMax, Wibree, a USB solution 1306A, a Bluetooth solution 1306B, and a ZigBee solution 1306C, according to one embodiment. An advanced communication interface may be at least one of a USB, a Bluetooth interface, a Zigbee interface, a WiFi interface, WiMax, Wibree, PoE, RS-232, RS-422, RS-485, and an Ethernet interface.

In an example embodiment, the USB solution 1306A may be a serial bus standard to connect devices to a data processing unit. The WiMax solution 1306A may be a telecommunications technology providing wireless data, voice, and video over long distances. The Wibree solution 1306A may be a digital radio technology (e.g., intended to become an open standard of wireless communications) designed for ultra low power consumption (e.g., button cell batteries) within a short range (10 meters/30 ft) based around low-cost transceiver microchips in each device. The Bluetooth solution 1306B is an open specification for seamless wireless short-range communications of data and voice between both mobile and stationary devices. The Wifi solution 1306N may use low power microwave radio to link one or more groups of users together. A Power over Ethernet (PoE) solution 1306N may be a system to transfer power and data to remote devices. RS (Recommended Standard) solutions such as RS-232, RS-422, RS-485 may be data communication standards. An advanced communication interface may be communicatively coupled to the data storage or the data processing module 2204.

FIG. 23 illustrates a reaction torque sensor with a USB digital interface option, according to one embodiment. In particular, FIG. 23 illustrates the reaction torque sensor 2350 having a universal serial bus interface as a force measuring device, according to one embodiment. The reaction torque sensor 2350 may include a movable surface, a fixed surface, the housing, and the power module that may make use of an advanced communication interface. The housing may encompass a reference spring, a spring assembly, and the circuit.

FIG. 24 illustrates the sensing rack which includes a sensor concentrator 2406, according to one embodiment. A force measuring device 2400A-N may be a load cell. A sensor concentrator 2406 may be a sensor interface device that communicates simultaneously with one or more load cells. The sensor concentrator 2406 may uplink directly to the data processing system 2408 through a wired USB connection or wirelessly through an advanced communication interface 2420. The optional software can be used to monitor and log sensor output.

For better flexibility, a USB load cell can be coupled with a wireless setup. This approach allows for the installation of measuring equipment in areas where it is impractical to run connection cables. A wireless hub can handle four load cells simultaneously for situations that require multiple readings. The data can then be processed and tracked with aid of computer software.

The data processing system 2408 may include a supply chain application 2410 and Vendor Managed Inventory (VMI) software 2412. The VMI (e.g., VMI software 2412) may be an inventory management system of at least one of a transportation operator, a manufacturer, a distributor, and a retailer through an internet based software application 2418 that provides the measurement as an inventory level. The inventory level may be at least one of a dry bulk goods inventory level, a discrete parts inventory level, and a volume based inventory level. In one embodiment a force measuring device is compliant for use with any personal digital assistance (PDA) such as an Apple-iPhone™ for data input and output. In another embodiment an Apple-iPhone™ using standard interface compliant with its application programming interface enables to communicate with wireless devices including the force measuring device. In yet another embodiment a PDA such as an Apple-iPhone™, which is compliant with programming interface of the force measuring device enables one to wirelessly capture measurements remotely or locally.

The input to the data processing system 2408 may be a manual entry 2414 and/or a barcode reader 2416. The barcode reader 2416 may be an electronic device for reading printed barcodes. The barcode reader 2416 may include a light source, a lens and a light sensor translating optical impulses into electrical ones. In addition, the barcode reader may include a decoder circuitry that analyzes the barcode's image data provided by a sensor.

In an example embodiment, the sensing rack 2424 may include an alarm, a force measuring device 2400A-N. A force measuring device 2400A-N may be communicatively coupled to a sensor concentrator 2406. The sensing rack 2424 may include optional wheels 2422 for transportation and accessibility. The alarm may include a load cell indicator system that transmits a data value to be detected by at least one load cell, to an indicator through an advanced communication interface. The advanced communication interface 2420 may include a USB interface, a Bluetooth interface, a Zigbee interface, a WiFi interface, a WiMax interface, a Wibree interface, a RS-232 interface, a RS-422 interface, a RS-485 interface, an Ethernet interface and a PoE interface etc., to the display 2402. The display 2402 may provide the data value detected by each of the load cell and the total data value corresponding to the sum of the data values detected by respective load cells to the data processing system 2408 in the sensing rack 2424. The load cell indicator system may include load cell transmission modules for measuring physical quantities to be detected and processed with the aid of computer software. The computer software may be interfaced with an internet based application 2418 using one or more load cells and transmitting the data values corresponding to the physical quantity. The total physical quantity corresponding to the sum of the physical quantities of the respective load cells generated may be measured and displayed to the data processing system 2408 through an advanced communication interface 2420. The physical quantities may be tabulated accordingly as shown in FIG. 19.

FIG. 25 illustrates a process flow diagram detailing the steps involved in measuring a change in resistance in a sensor system and communicating the measurement through an advanced communication interface, according to one embodiment. Step 2502 may involve forming a resistive sensor of FIGS. 1-4, having a fixed surface and a movable surface, in accordance with one or more embodiments of the invention. Step 2504 may involve positioning a restoring device between the fixed surface and the movable surface such that the restoring device is caused to alter in height in response to a force applied perpendicular to the movable surface. In one or more embodiments, the change in height of the restoring device may cause a change in resistance of the resistive sensor. In one or more embodiments, the restoring device may be a spring assembly.

Step 2506 may involve generating a measurement of the aforementioned force applied perpendicular to the movable surface through a circuit based on an algorithm that considers a change in the resistance of the resistive sensor. Step 2508 may involve communicating the measurement of the force in Step 2506 through an advanced communication module of the data processing module of the resistive sensor serving as a force measuring device.

In one or more embodiments, a reference restoring device (e.g., a spring) may be coupled to the force measuring device to enable the force measuring device of Steps 2502-2508 to adjust the resistance of the restoring device based on environmental conditions. In one or more embodiments, the environmental conditions may include at least one of humidity, temperature, and air pressure of the environment surrounding the force measuring device.

In one or more embodiments, the process flow may further involve minimizing an effect of a stray electrical property affecting the measurement of the force applied perpendicular to the movable surface by providing a shielding spacer between the reference restoring device and the force measuring device including the resistive sensor.

In one or more embodiments, the process flow may further involve encompassing the reference restoring device, the restoring device, and the circuit within a housing. Step 2506 may further involve attaching electrodes to the fixed surface and the movable surface of the resistive sensor. In one or more embodiments, step 2502 may involve stacking washers to form the restoring device positioned between the fixed surface and the movable surface of the resistive sensor of FIGS. 1-4 to form the force measuring device. In one or more embodiments, the washers used to form the restoring device may be conical in shape.

In one or more embodiments, step 2504 may involve deflecting the restoring device both in the direction of the applied force and perpendicular to the direction of the applied force such that the perpendicular (transverse) deflection does not touch any portion of the fixed surface and movable surface of the resistive sensor. In one embodiment, step 2506 may involve applying an algorithm to convert a change in the resistance of the resistive sensor to one of a voltage response and a frequency response to automatically generate the resistance measurement.

In one or more embodiments, steps 2502-2508 may involve storing power in the force measuring device. In one or more embodiments, storing power may be accomplished using a battery. In an ideal case, the battery may be at least one of a rechargeable battery (e.g., a lead acid battery, a nickel-cadmium battery, a lithium-ion battery, etc.) for storing power. However, alternate sources of energy in the form of renewable energy. For example, a wind power chargeable battery, and a solar power battery, etc., may also be utilized for storing power. Step 2508 may involve displaying the aforementioned resistance measurement. In one or more embodiments, the resistance measurement may be displayed to a user of a software application of a data processing system that may be communicatively coupled to the force measuring device.

Step 2508 may further involve communicating between the force measuring device and the data processing system through a network. In one or more embodiments, the communication may be wireless. Step 2504 may further involve forming a contact zone cavity around a periphery of the movable surface in FIG. 11. In one or more embodiments, step 2506 may then involve providing the measurement under a tension and compression mode when the force measuring device is an S-beam load cell, as shown in FIG. 16.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

I claim:

1. A force measuring device comprising:
a fixed surface and a movable surface;
a member positioned between the fixed surface and the movable surface, the member caused to deflect in response to a force applied to the movable surface and to cause a change in an electrical property of the force measuring device;
a circuit to measure the force based on an algorithm that considers the change in the electrical property of the force measuring device; and
a data processing module of the force measuring device to communicate a measurement through an advanced communication interface
the advanced communication interface is at least one of a Universal Serial Bus (USB) interface, a Bluetooth interface, a Zigbee interface, a WiFi interface, a WiMax interface, a Wibree interface, a RS-232 interface, a RS-422 interface, a RS-485 interface, an Ethernet interface and a Power over Ethernet interface,
means for applying an algorithm to convert a change in the electrical property to at least one of a voltage response and a frequency response to automatically generate the measurement, wherein the electrical property is at least one of a capacitance, a resistance, and an inductance;
the force measuring device is at least one of a pancake sensor and a S-beam load cell that provides the measurement when under at least one of a tension and a compression mode;
wherein when the force measuring device is the pancake sensor, the pancake sensor includes a contact zone cavity formed in a ring like fashion around a periphery of the movable surface, a conical washer between the fixed surface and the movable service, a female thread through the center and at least one hole on an outer ring to mount the pancake sensor to another assembly; and
wherein when the force measuring device is the S-beam load cell, the S-beam load cell includes a flexible strain relief material, and a reference spring between the fixed surface and the movable service, and at least one hole on an outer portion to mount the S-beam load cell to another assembly.

* * * * *

UNITED STATES PATENT AND TRADEMARK OFFICE
CERTIFICATE OF CORRECTION

PATENT NO.        : 7,644,628 B2                                              Page 1 of 1
APPLICATION NO.   : 12/477927
DATED             : January 12, 2010
INVENTOR(S)       : Divyasimha Harish It is certified that error appears in the above-identified patent and that said Letters Patent is hereby corrected as shown below:

In the Specifications:
In column 5, line 50, delete "110" and replace with -- 210 --.
In column 5, line 51, delete "170" and replace with -- 270 --.
In column 10, line 13, delete "906" and replace with -- (DC) 906 --.
In column 10, line 16, delete "906" and replace with -- (DC) 906 --.
In column 10, line 17, delete "908" and replace with -- (DV) 908 --.
In column 10, line 17, delete "910" and replace with -- (DF) 910 --.

In the Claims:
In column 18, line 29, delete "Service" and replace with -- Surface --.
In column 18, line 35, delete "Service" and replace with -- Surface --.

Signed and Sealed this
Sixteenth Day of July, 2013

Teresa Stanek Rea
*Acting Director of the United States Patent and Trademark Office*